United States Patent
Beard et al.

(10) Patent No.: US 7,302,316 B2
(45) Date of Patent: Nov. 27, 2007

(54) PROGRAMMABLE AUTOPILOT SYSTEM FOR AUTONOMOUS FLIGHT OF UNMANNED AERIAL VEHICLES

(75) Inventors: Randal W. Beard, Orem, UT (US); Walter H. Johnson, Provo, UT (US); Reed Christiansen, Simi Valley, CA (US); Joshua M. Hintze, Provo, UT (US); Timothy W. McLain, Provo, UT (US)

(73) Assignee: Brigham Young University, Provo, UT (US)

( * ) Notice: Subject to any disclaimer, the term of this patent is extended or adjusted under 35 U.S.C. 154(b) by 499 days.

(21) Appl. No.: 10/940,411

(22) Filed: Sep. 14, 2004

(65) Prior Publication Data

US 2006/0058928 A1 Mar. 16, 2006

(51) Int. Cl.
*B64C 1/00* (2006.01)

(52) U.S. Cl. .................. 701/11; 701/3; 701/13; 340/948; 342/357.09; 244/75.1

(58) Field of Classification Search .............. 701/3, 701/11, 13; 340/948; 342/357.09, 357.1; 244/75.1
See application file for complete search history.

(56) References Cited

U.S. PATENT DOCUMENTS

| | | |
|---|---|---|
| 4,314,341 A | 2/1982 | Kivela |
| 4,330,827 A | 5/1982 | Kettler |
| 4,378,518 A | 3/1983 | Nixon |
| 4,428,052 A | 1/1984 | Robinson et al. |
| 4,542,464 A | 9/1985 | Kramer |
| 4,644,538 A | 2/1987 | Cooper et al. |
| 4,692,868 A | 9/1987 | Wesner et al. |
| 4,862,372 A | 8/1989 | Appleford |
| 4,875,646 A | 10/1989 | Browning et al. |
| 4,914,598 A | 4/1990 | Krogmann et al. |
| 5,058,836 A | 10/1991 | Nobel |
| 5,067,674 A | 11/1991 | Heyche et al. |
| 5,152,239 A | 10/1992 | Hossfield et al. |
| 5,179,905 A | 1/1993 | Hossfield et al. |
| 5,235,927 A | 8/1993 | Singh et al. |
| 5,248,114 A | 9/1993 | Ankeney |
| 5,331,558 A | 7/1994 | Hossfield et al. |
| 5,337,982 A | 8/1994 | Sherry |

(Continued)

OTHER PUBLICATIONS

"A Highly Integrated UAV Avionics System," http://www.cloudcaptech.com/piccolo/PiccoloRev1.01.pdf, pp. 1-6, Apr. 10, 2003.

(Continued)

*Primary Examiner*—Gertrude A. Jeanglaude
(74) *Attorney, Agent, or Firm*—Madson & Austin

(57) ABSTRACT

A system and method for providing autonomous control of unmanned aerial vehicles (UAVs) is disclosed. The system includes a ground station in communication with an unmanned aerial vehicle. The method for providing autonomous control of a UAV includes methods for processing communications between the ground station and UAV. The method also includes procedures for processing commands from the ground station. Also included in the method is a process for estimating the attitude of the UAV and autonomously maintaining its altitude within a desired threshold. The method also includes a process for autonomously orbiting about a specified point in space. Combined with these processes, the method also includes a process for an autonomous takeoff and landing of the UAV.

21 Claims, 13 Drawing Sheets

U.S. PATENT DOCUMENTS

| | | | |
|---|---|---|---|
| 5,362,263 | A | 11/1994 | Petty |
| 5,523,949 | A | 6/1996 | Agate et al. |
| 5,581,250 | A | 12/1996 | Khvilivitzky |
| 5,769,359 | A | 6/1998 | Rutan et al. |
| 5,785,281 | A | 7/1998 | Peter et al. |
| 5,890,441 | A | 4/1999 | Swinson et al. |
| 5,945,943 | A | 8/1999 | Kalafus et al. |
| 5,978,715 | A | 11/1999 | Briffe et al. |
| 6,021,980 | A | 2/2000 | Wright et al. |
| 6,092,007 | A | 7/2000 | Cotton et al. |
| 6,119,976 | A | 9/2000 | Rogers |
| 6,308,116 | B1 | 10/2001 | Ricks et al. |
| 6,377,875 | B1 | 4/2002 | Schwaerzler |
| 6,454,218 | B1 | 9/2002 | Jacobson |
| 6,456,910 | B1 | 9/2002 | Roe |
| 6,460,810 | B2 | 10/2002 | James |
| 6,507,776 | B1 | 1/2003 | Fox, III |
| 6,584,382 | B2 | 6/2003 | Karem |
| 2001/0039467 | A1 | 11/2001 | Katz et al. |
| 2002/0022909 | A1 | 2/2002 | Karem |
| 2002/0035416 | A1* | 3/2002 | De Leon ............ 701/14 |
| 2002/0104923 | A1 | 8/2002 | Warsop et al. |
| 2002/0133294 | A1 | 9/2002 | Farmakis et al. |
| 2002/0193914 | A1 | 12/2002 | Talbert et al. |
| 2003/0014165 | A1 | 1/2003 | Baker et al. |
| 2003/0034902 | A1 | 2/2003 | Dickau |
| 2003/0055564 | A1 | 3/2003 | Tart et al. |
| 2003/0081757 | A1 | 5/2003 | Mengshoel et al. |
| 2003/0090228 | A1 | 5/2003 | Wilkens |
| 2003/0095652 | A1 | 5/2003 | Mengshoel et al. |
| 2003/0125848 | A1 | 7/2003 | Otake et al. |
| 2003/0127569 | A1 | 7/2003 | Bacon et al. |
| 2003/0130770 | A1 | 7/2003 | Matos |
| 2003/0135327 | A1 | 7/2003 | Levine et al. |
| 2003/0137444 | A1 | 7/2003 | Stone et al. |
| 2003/0141409 | A1 | 7/2003 | Lisoski et al. |
| 2003/0146853 | A1 | 8/2003 | Bolduc |
| 2003/0155463 | A1 | 8/2003 | Cox et al. |
| 2003/0183728 | A1 | 10/2003 | Huynh |
| 2003/0192985 | A1 | 10/2003 | Lipeles |
| 2003/0206119 | A1 | 11/2003 | Riley |
| 2003/0225489 | A1 | 12/2003 | Tsao |
| 2004/0015381 | A1 | 1/2004 | Johnson et al. |
| 2004/0059504 | A1 | 3/2004 | Gray |
| 2005/0036476 | A1* | 2/2005 | Eaton et al. ............ 370/349 |
| 2005/0060069 | A1* | 3/2005 | Breed et al. ............ 701/29 |

OTHER PUBLICATIONS

"MP2028ᵍ Miniature UAV Autopilot," http://www.micropilot.com/products/MP2028g.pdf, pp. 1-2, Last Visited Oct. 19, 2004.

"Autonomous Vehicle Technologies for Small Fixed Wing UAVs", Kingston et al., 2nd AIAA "Unmanned Unlimited" Systems, Sep. 15-18, 2003, pp. 1-10.

"BYU Engineers Take Cameras to the Skies with New Unmanned Plane Technology", http://byunews.byu.edu/release.aspx?q=autopilot&story=archive03/oct/miniplanes, pp. 1-2.

"Kestrel Autopilot", http://www.magicctech.com/magiccpilot.html, pp. 1-3.

"Design of an Autopilot for Small Unmanned Aerial Vehicles", Reed Christiansen, http://www.et.byu.edu/~reedc/files/Thesis_Reed_Christiansen_6_21_04.pdf, Aug. 2004, pp. 1-258.

* cited by examiner

PROGRAMMABLE AUTOPILOT SYSTEM FOR AUTONOMOUS FLIGHT OF UNMANNED AERIAL VEHICLES

GOVERNMENT RIGHTS

Portions of the present invention were made with Government support under AFOSR grants F49620-01-1-0091 and F49620-02-C-0094, and by DARPA grant NBCH1020013. The Government may have certain rights in the invention.

TECHNICAL FIELD

The present invention relates generally to control of unmanned aerial vehicles. More specifically, the present invention relates to systems and methods for providing autonomous control of unmanned aerial vehicles through an autopilot board.

BACKGROUND

Due to recent directives from the Department of Defense, there is great pressure to develop the technology behind unmanned aerial vehicles (UAVs). UAVs are remotely piloted or autonomous aircraft that can carry cameras, sensors, communications equipment, or other payloads.

UAVs have proven their usefulness in military applications in recent years. Large UAVs have become an integral part of the U.S. arsenal. Large UAVs have executed surveillance and tactical missions in virtually every part of the world. The military is also making use of smaller UAVs, known as miniature and micro UAVs. Mini UAVs have been used all over the world by small military units as a short-range video reconnaissance platform. The mini UAVs have proven themselves as robust and reliable, but do have disadvantages. One disadvantage of the Mini-UAVs is that they typically require 2- to 3-man crews to transport and operate them.

In addition to military applications, there are many civilian applications for UAVs. There is great interest in adopting UAVs for a variety of applications. These include government applications, such as fire fighting and law enforcement. The U.S. spends millions of dollars each year patrolling borders with conventional aircraft. If border agents were equipped with UAVs, thousands of dollars could be saved, as UAVs cost much less then similarly equipped full-size aircraft. In the private sector, there also exists a range of surveillance applications for UAVs. One example is use by the media. Newscasters spend millions of dollars on piloted helicopters to cover breaking news stories. UAVs could be launched over a breaking story to gather aerial footage immediately.

The increasing power of computational resources has enabled the development of autonomous flight control systems that are capable of dealing with the complex task of path planning in dynamic and uncertain environments. Such path planning algorithms and route navigation aids are needed to accomplish future uses of UAVs.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
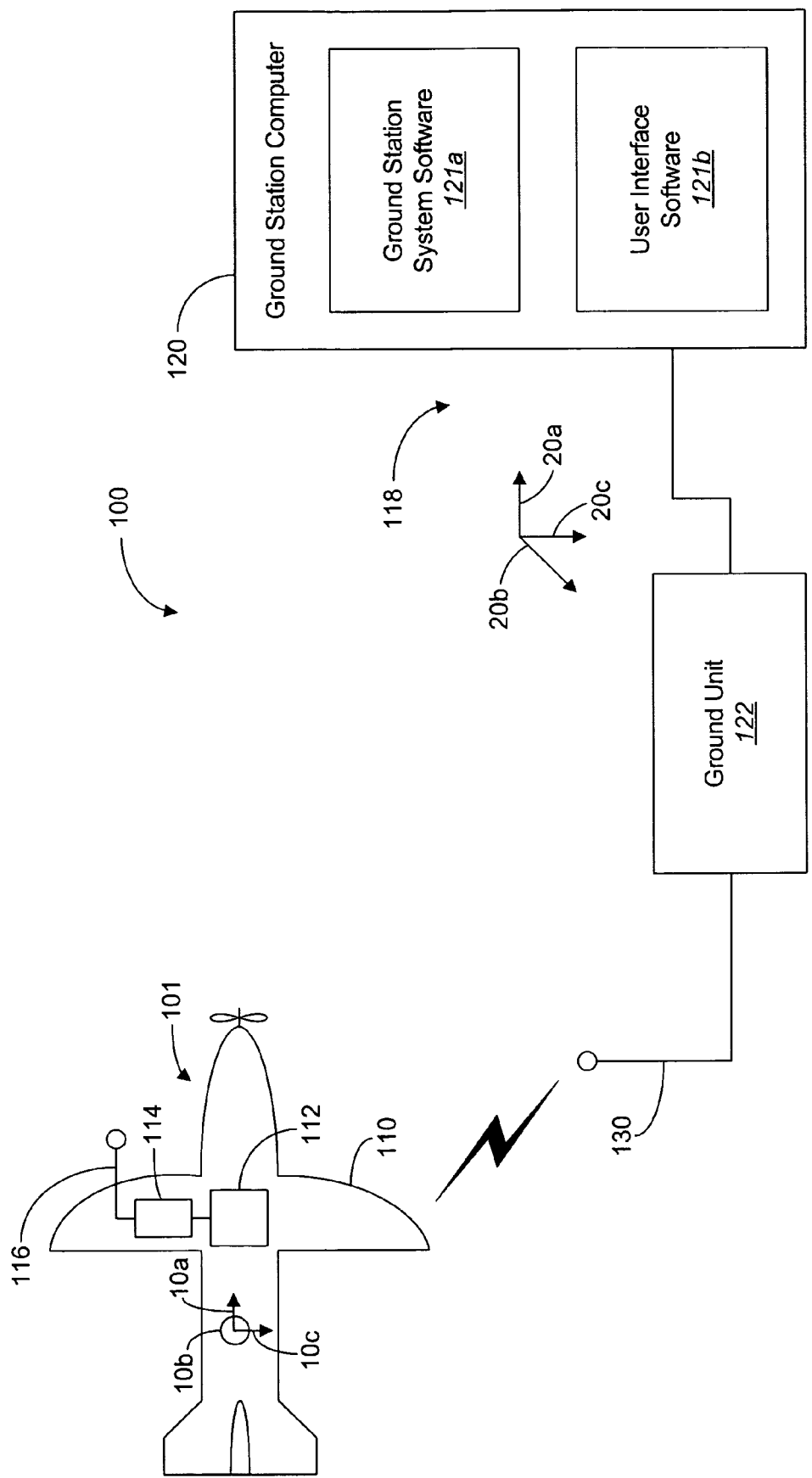
FIG. 1 is a composite block diagram illustrating the communications system between a ground station and a UAV according to one embodiment of the autopilot UAV system.

A control system for autonomously controlling an unmanned aerial vehicle (UAV) is disclosed. The autopilot system may include a ground station in wireless communication with an on-plane control system. According to one embodiment, the on-plane control system includes a processor and memory in electronic communication with the processor. The on-plane control system also includes a number of different sensors in electronic communication with the processor. A first set of sensors includes three accelerometers. A second set of sensors includes three rate gyroscopes. An absolute pressure sensor and a differential pressure sensor are also utilized. Furthermore, the on-plane control system may also have a global positioning system.

In order for the on-plane control system and the ground station to communicate wirelessly, the on-plane control system includes a transceiver that can receive and transmit wireless signals. This transceiver may be a digital modem. Furthermore, the on-plane control system is connected to a power source, which may be the same power source that also is used to power an actuator used to propel the UAV.

According to another embodiment the ground station also includes a processor and memory in electronic communication with the processor. The ground station has a user interface that is in electronic communication with the processor. In order to communicate wirelessly with the UAV, the ground station also includes a transceiver to receive and transmit wireless signals. Like the on-plane control system, this transceiver may also be a digital modem. The flight control parameters of the UAV may be reconfigurable from the ground station while the UAV is in flight.

A further embodiment of the ground station also includes an RC controller in electronic communication with the processor. The RC controller may be used for manual control of the UAV, if desired. When manual control is desirable the on-plane control system further includes a bypass circuit that allows the UAV to be controlled by the RC controller instead of the on-plane autopilot control system.

Another embodiment of the autopilot control system includes executable instructions on the on-plane control system that are executable by the processor. The executable instructions are configured to implement a method for estimating the attitude of the UAV. This method includes the steps of sampling the state variables that are provided in part by the accelerometers, rate gyroscopes, the absolute and differential pressure sensors and the global positioning system. Once the state variables are sampled, they are processed through a fixed gain Kalman Filter, whereupon new state variable estimates are calculated. The new state variable estimates are then stored in the on-plane memory.

The executable instructions may also be configured to implement a method for tracking the desired altitude of the UAV. This method includes reading a desired altitude and a tolerance window. If the UAV deviates form the desired altitude but is within the tolerance window, the pitch angle of the UAV is adjusted to reach the desired altitude. If the UAV is below the desired altitude and outside of the tolerance window, the pitch angle is adjusted and the throttle is increased so that the UAV may reach the desired altitude. If the UAV is above the desired altitude and outside the desired tolerance window, the pitch angle is adjusted and the throttle decreased to reach the desired altitude.

The executable instructions may further be configured to implement a method for loitering the UAV about a desired waypoint. This method includes reading a desired waypoint and orbiting radius around that waypoint. The attitude of the UAV is then estimated. If a heading angle error exists it is calculated. Any loiter radius error of the UAV is also calculated. If any detected error exists the roll of the UAV is adjusted to compensate for that error.

According to another embodiment, the executable instructions may also be configured to implement a method for automatic take-off of the UAV. This method includes estimating the attitude of the UAV. A constant pitch of the UAV is maintained until a desired climb-out altitude or desired airspeed is achieved. Once the desired climb-out altitude or airspeed is achieved, the desired altitude is tracked as discussed above and the UAV loiters about a desired waypoint.

The executable instructions may further be configured to implement a method for automatic landing of the UAV. This method includes setting the desired altitude at a particular flare height. That flare height is tracked using the altitude tracking method and the UAV loiters about a desired waypoint until the flare height is reached. Once the flare height is reached the UAV is maintained at zero roll and a constant pitch and the altitude tracking method is again implemented where the desired altitude is the desired landing altitude.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion; however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a composite block diagram illustrating the communications system between a ground station and an unmanned aerial vehicle (UAV) according to one embodiment of an autopilot UAV system 100. The autopilot UAV system 100 provides intelligent, autonomous flight control of a UAV 101. One embodiment of the autopilot UAV system 100 provides flight control of attitude, altitude and GPS waypoint navigation of the UAV 101 as well as fully autonomous take-off, flight, and landing routines. According to one embodiment of the autopilot UAV system 100, the UAV 101 operates under an electrical power source (See FIG. 2). The hardware that contributes to the small size and weight of the UAV 101 and the software processes that provide for the effectiveness of the avionics system will be described in more detail below, in conjunction with FIGS. 2 through 13.

Referring still to FIG. 1, the autopilot UAV system 100 may be effectively used in a variety of military and commercial applications. Such military uses may include, but are not limited to, surveillance, reconnaissance, target identification and battlefield assessment. Exemplary commercial applications include search and rescue applications, wildlife and forest management, border patrol, homeland security, traffic monitoring and aerial mapping. The autopilot UAV system 100 may alternatively be used in environmental monitoring (e.g., pollution, weather, and scientific applications), forest fire monitoring, drug traffic interdiction, aerial surveillance, precision agriculture, disaster relief, and in ad-hoc communications networks.

The autopilot UAV system 100 of FIG. 1 includes an airframe 110 with a UAV board 112 physically connected to the airframe 110. The UAV board 112 and its components will be discussed in greater detail in conjunction with the discussion of FIG. 2. The airframe 110 may include a simple flying wing shape with very few appendages to break or suffer damage in a crash. The airframe 110 may also have a soft leading edge, which absorbs impact energy thereby protecting the UAV 101. In certain embodiments, the airframe may be lightweight and/or have room for installation of the autopilot avionics and antennas. It may also be desirable to choose an airframe without a pre-installed electric motor, such that an efficient choice of motor and battery with higher performance and runtime could be installed. One commercially available airframe that has some of these characteristics is the Zagi THL airframe. There are also many other commercially available airframes that would be acceptable for use in the UAV 101 as an airframe 110.

By way of orientation, the body axes involved in flight include the longitudinal axis 10a that runs through the body of the airframe 110. Roll motion occurs about longitudinal (x) axis 10a. Vertical (z) axis 10b is perpendicular to longitudinal axis 10a and is directed down through the belly of the aircraft. Yaw motion occurs about the z axis 10b. Lateral axis (y) 10c is perpendicular to both longitudinal (x) axis 10a and vertical (z) axis 10b and is directed out the right side of the aircraft. Pitch motions occur about the lateral (y) axis 10c. Additionally, by way of orientation, the earth's axes, which are used to navigate, include the X-axis 20a pointed North, Y-axis 20b pointed East, and Z-axis 20c, which is perpendicular to both X-axis 20a and Y-axis 20b and points into the ground.

The UAV board 112 is in electronic communication with a UAV transmitter/receiver 114. The UAV transmitter/receiver 114 may also be referred to as a transceiver. The UAV transmitter/receiver 114 sends and receives data through a UAV antenna 116. The UAV board 112 sends and receives data to and from a ground station 118. The ground station 118 may include a ground station computer 120 running ground station system software 121a as well as user interface software 121b. The ground station system software 121a generates and/or processes desired command instructions to be sent to the UAV 101, as well as monitoring the status of the UAV 101. The user interface software 121b provides a user interface for allowing a user to view and interact with the autopilot UAV system 100, including the ground station system software 121a. Various kinds of computing devices may be used to implement the ground station computer 120 including, but not limited to, a laptop computer, a desktop computer, a personal digital assistant, and a tablet PC. Computing devices may use a variety of operating systems including, but not limited to, Linux, Mac OS, and Windows95/98/NT/2000/XP.

The ground station computer 120 is in electronic communication with a ground unit 122. The components of the ground unit 122 will be set out in more detail in conjunction with FIG. 3. The ground unit 122 transmits and receives data to and from the UAV board 112 through a ground antenna 130. The UAV antenna 116 and the UAV transmitter/receiver 114 receive the data from the ground antenna 130.

Figure 2:
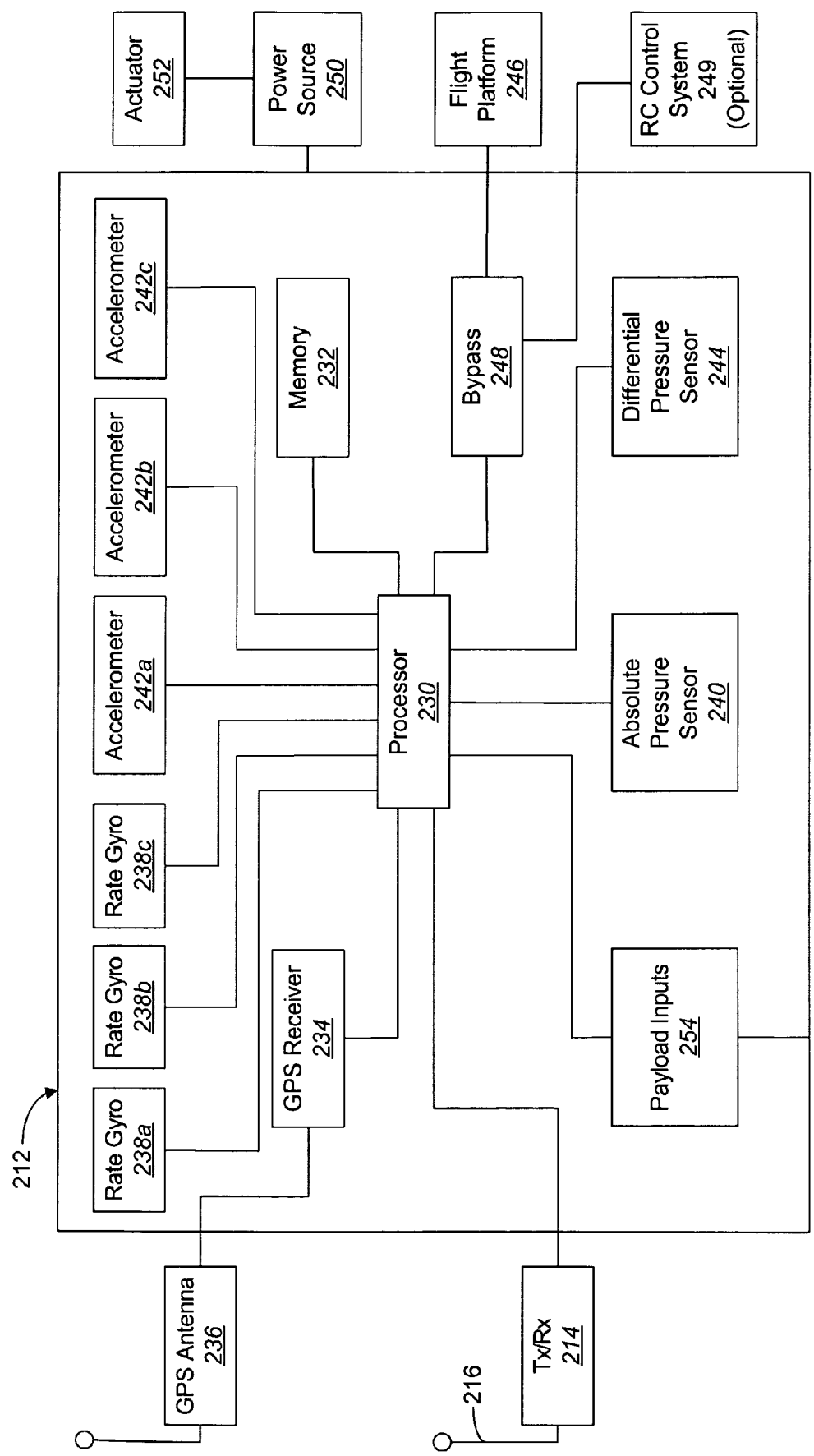
FIG. 2 is a block diagram illustrating the main hardware components of one embodiment of a UAV board.

FIG. 2 is a block diagram illustrating the main hardware components of one embodiment of a UAV board 212. The UAV board 212 includes a processor 230, which is responsible for processing data and executing commands and instructions. The UAV board 212 may be embodied in a printed circuit board. However, components depicted as on the board or off the board could be remote from or located on a printed circuit board respectively. There may also be multiple circuit boards involved.

The processor 230 may be responsible for processing sensor data, handling I/O to the GPS receiver 234, UAV transmitter/receiver 214, and bypass circuit 248, running the low-level control algorithms, and handling communications with the ground station. Additionally it may be desirable that the processor 230 have additional serial and digital I/O ports, and be capable of rapid 32-bit floating point operations as well as having sufficient RAM and flash memory for autopilot source code storage and runtime execution. In addition to these characteristics, it may also be desirable to be small and lightweight. One commercially available processor that embodies these attributes is the Rabbit Semiconductor RCM3100 core module.

The processor 230 is in electronic communication with various sensors and is responsible for processing raw data from the various sensors and storing and transmitting the data. Sensors and other inputs into the processor 230 may utilize low pass filters and operational amplifiers and analog to digital converters in order to pre-process the signal before communicating data to the processor 230. Though low-pass filters and operational amplifiers may be desirable pre-processing methods, there are many methods for pre-processing the data before it is sent to the processor 230.

The processed data is stored in some form of memory 232, which is in electronic communication with the processor 230. The memory 232 in one embodiment includes both 512 kbytes of random access memory (RAM) and 512 kbytes of flash memory. Those skilled in the art will recognize that the memory 232 is not limited to this combination but could also, for example, include solely RAM or flash memory or additionally multiple hard drives or other forms of storage or combination thereof.

To control the UAV effectively, accurate, timely estimates of the aircraft states are desirable. The first states of interest are X and Y, which represent the UAV's inertial position in the north direction and east direction, respectively. These states are measured directly using a GPS receiver 234. The GPS receiver 234 is in electronic communication with the processor 230. Some desired characteristics of the GPS receiver 234 may include: (1) an integrated antenna, making it self-contained and low-maintenance, (2) being very small and lightweight, and (3) having a 12-channel receiver, low fix time, and the ability to accept differential corrections. One commercially available GPS receiver 234 that embodies these characteristics is the Furano GH-80. Alternatively, other GPS receivers 234 may also be capable of providing accurate, timely measurements of the UAV position.

The GPS receiver 234 receives its data through a GPS antenna 236. In one embodiment, the GPS antenna 236 is integrated into the GPS receiver 234. In another embodiment, the GPS antenna 236 is externally mounted on a wing of the UAV but remains in electronic communication with the GPS receiver 234 and the processor 230. The GPS antenna 236 may also be mounted at alternative locations on the UAV. The data processing of the GPS receiver 234 and all other sensors will be discussed in further detail in conjunction with the discussion of FIG. 4.

Rate gyros 238a-c measure the next states of interest: the UAV's fixed rotational rates, p, q, and r. The rate gyros 238a-c are also in electronic communication with the processor 230. Desirable characteristics of the rate gyros 238a-c include having a low drift rate, small physical size, and a built-in temperature sensor. An additional desirable characteristic is a maximum measurable rotational rate of 300 degrees/second. One commercially available rate gyro 238a-c that embodies these desirable characteristics is the Analog Devices ADXRS300 rate gyro. Alternatively, the Tokin LD-16, or other rate gyros, may be used to measure the rotational rates of the UAV. The rate gyros 238a-c are mounted orthogonally such that rotational rates about the body axes 10a-c (shown in FIG. 1) can be sensed.

In order to measure the altitude of the UAV, an absolute pressure sensor 240 is used. The absolute pressure sensor 240 is in electronic communication with the processor 230. Some desirable characteristics of the absolute pressure sensor 240 include internal temperature compensation and signal conditioning. One commercially available absolute pressure sensor 240 that embodies these characteristics is the Motorola MPX 4115a pressure sensor. Alternatively, the Motorola MPX3000 may be used to measure the altitude of the UAV.

Accelerometers 242a-c measure the body fixed accelerations Ax, Ay, and Az. The accelerometers 242a-c are in electronic communication with the processor 230. Desirable characteristics of an accelerometer may include: providing accurate results when the UAV is not in a coordinated turn condition, lightweight, and requiring no extensive calibration and re-calibration for use. One commercially available accelerometer that embodies these characteristics is the ADXL202E two-axis MEMS accelerometer from Analog Devices. Alternatively, other accelerometers may be used which would measure the body fixed accelerations. In one embodiment, the UAV board 212 utilizes three accelerometers 242a-c. In another embodiment only two accelerometers 242a-b are used. The accelerometers 242a-c are mounted orthogonally such that accelerations about the body axes 10a-c can be sensed.

The velocity of the UAV is measured using a differential pressure sensor 244. The differential pressure sensor 244 is in electronic communication with the processor 230. As with the absolute pressure sensor 240, some desirable characteristics of the differential pressure sensor 244 include internal temperature compensation and signal conditioning. One commercially available differential pressure sensor 244 that embodies these characteristics is the Motorola MPX 5000 pressure sensor. Alternatively, the Motorola MP4015 or the Motorola MPXV4006DP may be used to measure the velocity of the UAV.

The differential pressure sensor 244 outputs a voltage based on the difference in pressure between its two external ports. A pitot tube is connected to one of the ports and the other is left open to the ambient air. The flow of air against the pitot tube causes a pressure difference proportional to the speed of the air. The corresponding voltage produced by the sensor is used to calculate the airspeed of the UAV.

The processor 230 is also in electronic communication with payload inputs 254. The payload inputs 254 may include data from a video processing unit or any other data that involves a payload on the UAV. Additional exemplary payload inputs 254 may include sound data from a sound sampling payload, IR data from infrared detectors, chemical data from chemical sniffers, or radar data collected by a radar unit.

The UAV is controlled using flight actuators 246. The flight actuators include servos that control the flight of the UAV. Some desirable characteristics of the servos are quick response time, robustness, and lightweight. One commercially available servo that has these characteristics is the Hitec HS-55 servo. Alternatively, many other servos may also possess these attributes. The processor 230 is in electronic communication with the flight actuators 246. For example, in one embodiment, elevators and ailerons control the flight of the UAV. In another embodiment, a rudder is used in addition to the elevators and ailerons to control the flight of the UAV. Various methods exist for controlling the flight of the UAV and these examples are not intended to limit the possible methods used.

It may be desirable to have an approach to autopilot development that allows testing of new algorithms and hardware with minimal risk to the aircraft or people on the ground. One such approach may involve a bypass circuit 248 in electronic communication with the flight actuators 246, which is in electronic communication with the processor 230. The bypass circuit 248 may also be in electronic communication with an onboard RC control system 249. The bypass circuit 248 might allow a human pilot to take control of the autopilot in the event of an autopilot malfunction. Should a problem arise during testing that puts the aircraft in danger, a human safety pilot may take control of the aircraft using a switch on an RC controller. The human pilot may either land the UAV, or fly the UAV until the problem is resolved and control is returned to the UAV board 212.

In one embodiment, when a human pilot takes control of the airplane via an RC controller, this switches control of the flight actuators 246 from the autopilot to an onboard 72 MHz RC control system 249. Control of the flight actuators 246 passes through the RC control system 249, to the bypass circuit 248 and then to the flight actuators 246. The bypass circuitry decodes the servo position signals from the 72 MHz RC receiver. Additionally, this may allow the RC controller stick positions to be used as flight control inputs. The stick positions may also be logged for system identification and flight analysis.

In an alternative embodiment, signals from the RC controller may be sent through the UAV transmitter/receiver 214. Control of the flight actuators 246 passes through the UAV transmitter/receiver 214, to the bypass circuit 248 and then to the flight actuators 246. According to this arrangement, an RC antenna on the UAV is not necessary.

In another embodiment, the bypass circuit 248 includes a microcontroller and a digital multiplexer. The microcontroller decodes the pulse position modulation servo position signals from the RC receiver. Channels 1-4 and 6-8 are decoded into values representing the servo pulse high time. Channel 5 is decoded separately and is used as the control signal. If the Channel 5 pulse falls below a set threshold, the microcontroller switches the digital multiplexer to connect the RC receiver servo outputs directly to the servos. This mode is known as pilot-in-control mode (PIC), as a human pilot through the 72 MHZ control link controls the aircraft.

If the channel 5 pulse rises above the threshold, the digital multiplexer may connect the autopilot servo outputs to the servos. This is known as computer-in-control mode (CIC), as the autopilot 100 has control of the aircraft. The decoded servo positions and PIC/CIC mode information may be sent to the UAV board 212 over an asynchronous serial port at 20 Hz. During PIC mode, the autopilot may log the servo control information that can be used for flight analysis. In CIC mode, the autopilot may be configured to use the servo position signals as control inputs to the low level PID loops for autopilot-assisted flight. The autopilot may also be configured to use the control signals in conjunction with the control efforts of the PID loops to test disturbance rejection.

The UAV board 212 is electrically connected to a power source 250. In one embodiment the power source includes three batteries. The power source 250 may be used to power the UAV board and connected accessories. In one embodiment, the power source 250 is also used to power an actuator 252 that propels the UAV.

The UAV board 212 transmits/receives data from the ground station 118 through the UAV transmitter/receiver 214. The UAV transmitter/receiver 214 is in electronic communication with the processor 230. It may be desirable for the UAV transmitter/receiver 214 to (1) support higher over-the-air data rate to control and monitor the aircraft, for example 57600 baud; (2) have a 5 km range using an omni-directional antenna; (3) weigh less than 1 ounce with a small size; and (4) cost less than a few hundred dollars. Additionally, to achieve responsive manual control over the digital communications link a low latency time between data arriving at the UAV transmitter/receiver 214, and the corresponding data arriving on the receiving modem is also desirable. One commercially available transmitter/receiver that has these attributes is the Aerocom AC4490-500 OEM modem. Alternatively, the 9XStream OEM module by Maxstream may also be used.

The UAV transmitter/receiver 214 is also in electronic communication with the UAV antenna 216, through which it sends/receives its data. Those skilled in the art will appreciate that the UAV antenna 216 may also be integrated into the UAV transmitter/receiver 214. When the aircraft banks, there may be a degradation in signal strength as the polarization of the UAV antenna 216 changes with respect to the ground station, shown in FIG. 1 as 118. Therefore, it may be desirable for the UAV antenna 216 to not require readjustment during flight and function normally during these potential brief periods of degraded communication. One UAV antenna 216 that embodies these characteristics is a custom-built omni-directional dipole antenna with ¼-wave radiating elements mounted on the UAV in a vertical orientation to match the vertical polarization of the ground antenna in level flight. Alternatively, many commercially available antennas may be available and used, including a Maxstream 3-dB gain dipole antenna, or an Aerocom 2-dB gain dipole antenna.

Figure 3:
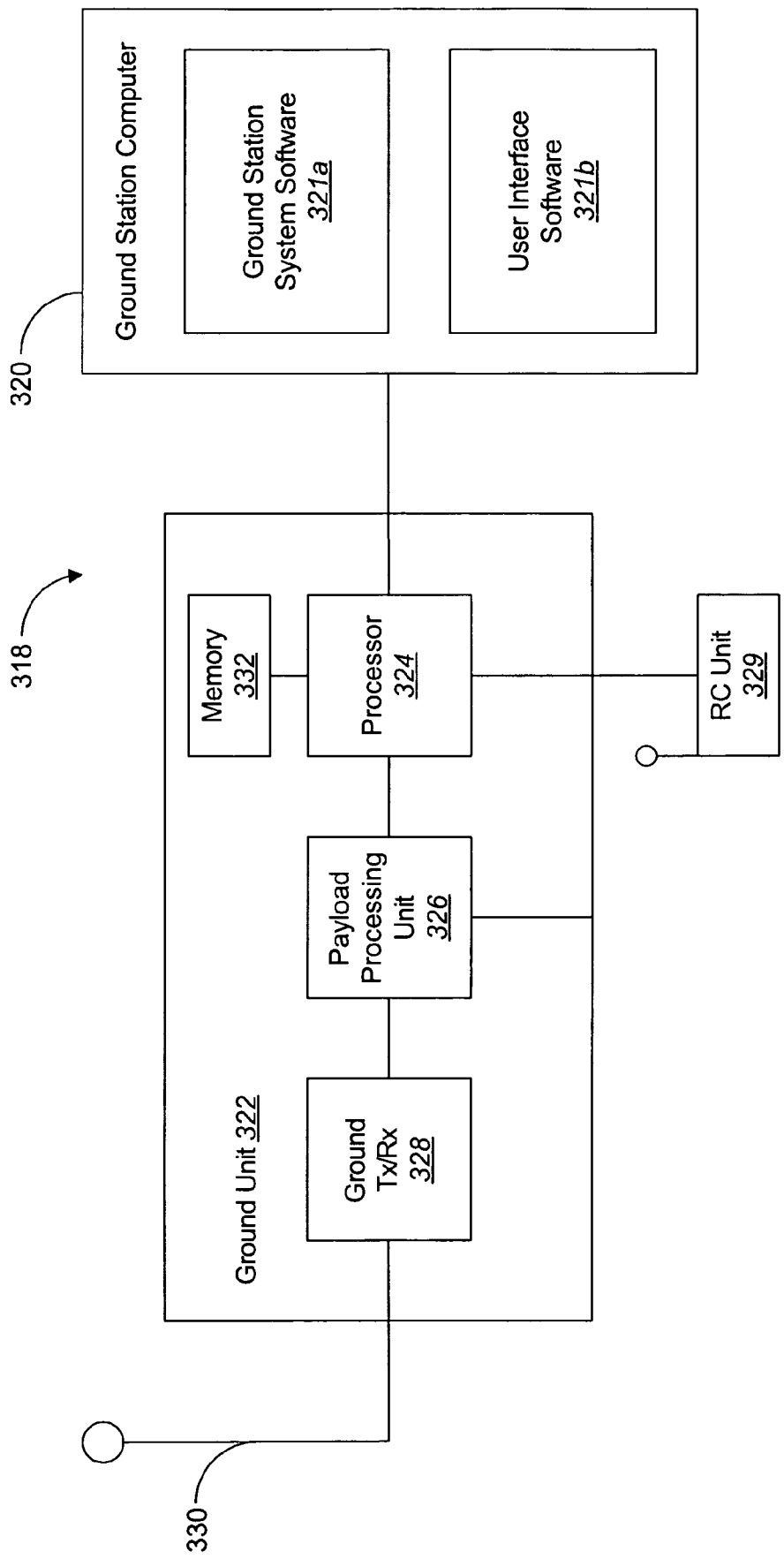
FIG. 3 is a block diagram illustrating the main hardware components of one embodiment of the ground station.

FIG. 3 is a block diagram illustrating the main hardware components of one embodiment of a ground station 318. As discussed above in FIG. 1, the ground station 318 includes a ground station computer 320 that in one embodiment is a laptop computer. The ground station computer 320 could also come in the form of a desktop computer, a personal digital assistant, a tablet PC or similar devices. As discussed above, the ground station computer 320 runs ground station system software 321a as well as user interface software 321b. The ground station computer 320 is in electronic communication with a ground unit 322. Electronic communication between the ground station computer 320 and the ground unit 322 may be accomplished via a serial or USB port.

The ground unit 322 comprises a processor 324, memory 332, payload inputs 326, a ground transmitter/receiver 328, and a ground antenna 330. As discussed in FIG. 2 above, the memory 332 may come in many forms and combinations, as those skilled in the art will recognize, such as RAM or flash memory or a hard drive. The processor 324 processes data from the ground station computer 320. In one embodiment, the processor 324 is in electronic communication with a payload processing unit 326. The payload processing unit 326 processes any payload data received from the UAV board, shown as 212 in FIG. 2, or payload commands from the ground station computer 320.

In one embodiment, the payload processing unit 326 comprises a 2.4 GHz video receiver. Those skilled in the art will understand that the payload processing unit 326 can take many forms based on the payload and is not limited to a video payload. Additionally, those skilled in the art will realize that the payload processing unit 326 may also be connected directly to the processor 324 or the ground station computer 320. Data from the payload processing unit 326, processor 324, or the ground station computer 320 is sent through the ground transmitter/receiver 328. The transmitter/receiver 328 may also be referred to as a transceiver. The ground transmitter/receiver 328 also receives data from the UAV board 212. The ground transmitter/receiver 328 may be the same type of transmitter/receiver that is used on the UAV as discussed above in conjunction with FIG. 2.

The ground transmitter/receiver 328 sends/receives data through the ground antenna 330. A manufacturer-supplied WCP-2400-MMCX ¼-wave 2-dB dipole antenna may be used on the ground station 318. Alternatively, the Aerocomm ¼-wave omni-directional antenna or other similar antennas may be used for the ground station antenna 330. In one embodiment, an RC controller 329 is in electronic communication with the ground unit 322.

Figure 4:
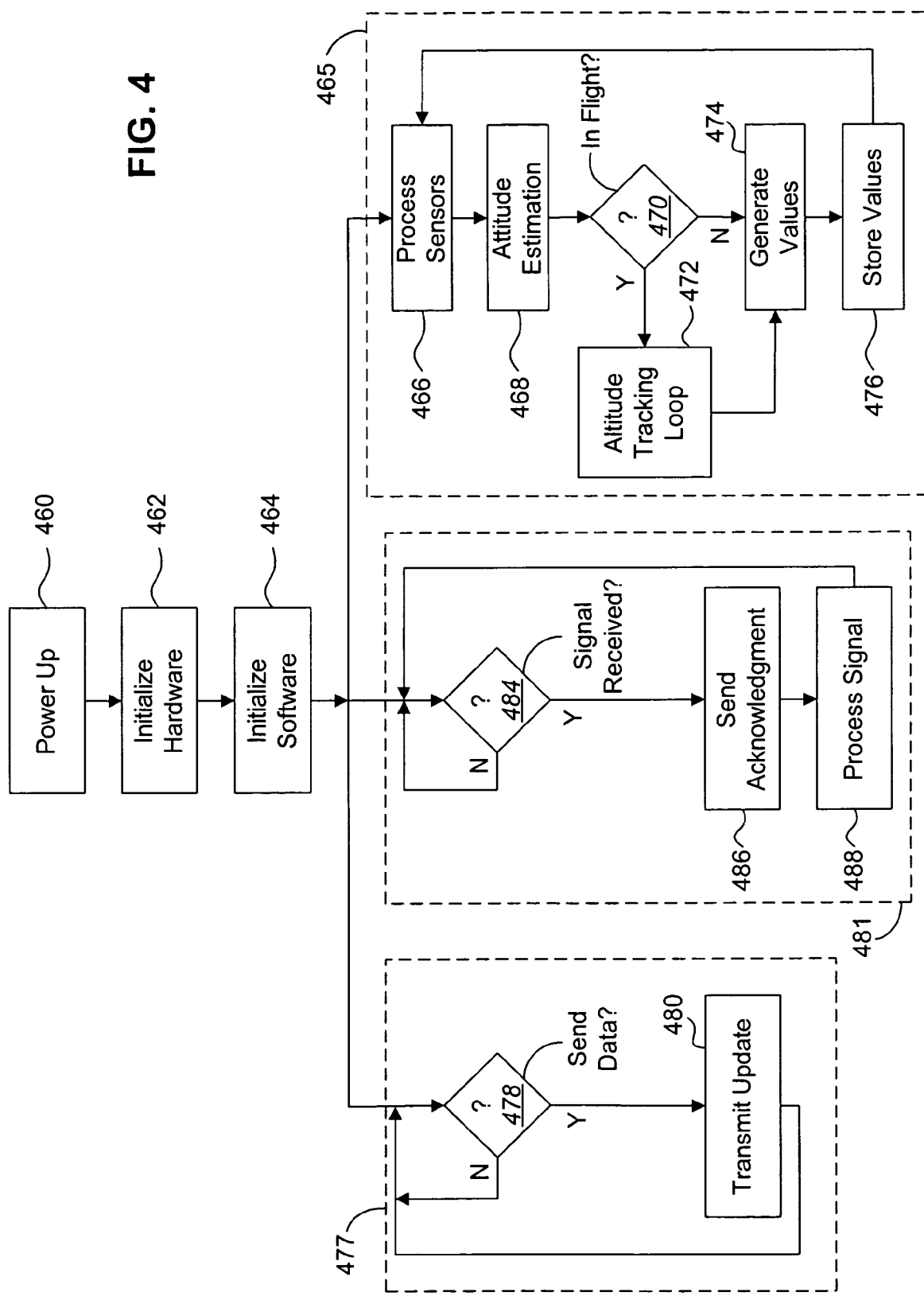
FIG. 4 is a flow diagram illustrating a method for several processes running on the UAV board.

FIG. 4 is a flow diagram illustrating a method for several processes running on the UAV board (FIG. 2, 212). The UAV board is powered up 460 to provide electrical power to the board. This provides power to the UAV board and all accessories in electronic communication with the UAV board.

Next, the UAV board hardware is initialized 462. This involves calibrating all sensors, processor, and the GPS receiver, both shown in FIG. 2 as 230 and 234 respectively. By way of example, the inputs on the processor associated with the payload inputs, GPS receiver input, UAV transmitter/receiver input, shown in FIG. 2 as 214, and the input for the analog to digital converters may be configured. Additionally, the inputs may be initialized to the correct baud rates and parity. The initialization 462 of the hardware may also initialize and calibrate the payload in addition to normal initialization procedures.

In one embodiment, the sensors are calibrated after the temperature on the UAV board has reached its steady state. Because many sensors are temperature dependent, some sensors may need to be calibrated. The calibration of the sensors may be performed before every flight. The absolute pressure sensor, shown in FIG. 2 as 240, is used as an example of the sensor calibration. The absolute pressure sensor produces a measurement of altitude in meters relative to the calibration point. The absolute pressure sensor should be calibrated at the location where the UAV will be flown. Because atmospheric conditions vary with time, calibration should take place before each flight.

According to one method, the calibration routine for the absolute pressure sensor gathers fifty samples of the absolute pressure sensor from the analog-to-digital converter with the autopilot on the ground. The fifty samples are averaged and stored in the sensor structure as the bias value. This value is subtracted from all future readings of the sensor to remove the sensor bias.

The calibration routine for the differential pressure sensor, shown in FIG. 2 as 244, uses the same 50-sample method as the routine for the absolute pressure sensor. The routine that acquires the bias for the differential and absolute pressure sensors may be called using a button on the ground station (FIG. 1, 118). This will often take place before each flight.

The rate gyro biases are gathered using the same technique explained above for the absolute pressure sensor. Calibration of the rate gyros, shown as 238a-c in FIG. 2, occurs because the rate gyros may be prone to drift. Because the output of the rate gyros is integrated to produce the roll, pitch, and heading estimates, small offsets in the calibrated rate gyro outputs may cause error in the attitude estimate 468. Determining an accurate value for the rate gyro biases may minimize any error. Moving the UAV may excite the p, q, and r rate gyros and the excited values will be averaged into the bias values, which may cause error in the calibrated values. Accurate values for the rate gyro biases may be obtained through keeping the UAV still.

In one method, calibrating the accelerometers, shown as 242a-c in FIG. 2, involves a two-step process. The first step is to acquire the biases for the x and y accelerometers. The bias value is the value output from the sensor when the sensor is not excited. The x and y accelerometers are not excited when their axes are perpendicular to the gravity vector and when the autopilot is not experiencing acceleration of any kind. This occurs when the autopilot is lying flat (with the bottom down) and still.

Next, the bias is acquired for the z accelerometer. The z accelerometer is not excited when its sensing axis is perpendicular to gravity. This occurs when the UAV board is tipped up on its edge (such that the z axis is perpendicular to Earth's gravity). The same fifty-sample technique used to acquire the absolute pressure sensor bias is used to acquire the accelerometer bias. The accelerometer biases may be acquired once the UAV board 414 is installed on the UAV.

For the GPS receiver, shown in FIG. 2 as 234, calibration is used to obtain the GPS home position. The GPS home position is the latitude, longitude, and altitude of the location of the ground station. This is the position that the relative positions of the aircraft (in meters east and meters north) are calculated from. The following formula may be used for this calculation:

$$X = (\text{longitude} - \text{h\_longitude}) \cdot \cos\left(\frac{\text{h\_latitude}}{60\frac{\min}{\deg}} \cdot \left(\frac{\pi}{180 \deg}\right)\right) \cdot 1853.2 \frac{\min}{\text{meter}}$$

$$Y = (\text{latitude} - \text{h\_latitude}) \cdot 1853.2 \frac{\min}{\text{meter}}$$

In the above equations, the longitude and latitude are in minutes. The X and Y position are in meters east and north of the GPS home position, respectively. The GPS altitude is also referenced from the altitude stored in the GPS home position.

The home position is also the set of coordinates to which the aircraft may fly, should it lose communication with the ground station. By way of example, the coordinates of the ground station may be the home position. The GPS home position is acquired automatically after GPS lock is first acquired. The first five samples after lock are averaged to form the home longitude, home latitude, and home altitude. Because the GPS position may tend to drift for some time after GPS lock is acquired, it may be desirable to re-acquire the GPS home position once the GPS position has stabilized.

After the UAV board is powered up, the software is initialized 464. This involves instancing and initializing the global structures and variables. In one embodiment, where the processor is in electronic communication with both volatile and non-volatile memory, the variables are initialized to hard-coded constants stored in the source code. These constants may be determined during autopilot development. They may be changed temporarily from the ground station and later placed in the source code. The parameters are initialized by nonvolatile memory. They may be changed from the ground station and the changes may be written to the nonvolatile memory. These parameters will be initialized to the new values the next time the software is initialized. The global structures are initialized in the same manner as the global variables. The sensor biases and PID gains are initialized from the nonvolatile memory, while the remaining structure members are initialized to values hard-coded in the autopilot source code.

After the hardware and software have been initialized (462 and 464 respectively), the UAV board, shown in FIG. 2 as 212, may begin to run several continuous loops simultaneously. One of these continuous loops, a sampling 465 loop, involves sampling and processing the sensors. The first step in this loop is to process 466 the sensors.

In one embodiment, the sensor data is sampled from the sensors after the data was electronically communicated through a low-pass filter, operational amplifier, and an analog-to-digital converter. Those skilled in the art will recognize that this pre-processing of the data may be performed using other methods or may possibly be skipped altogether. After the data from the sensors is sampled, they are stored. The raw analog values are then compensated for temperature drift by adding the multiple of the difference between the base temperature and current temperature values and a temperature compensation coefficient for each sensor. The current temperature value is read from the temperature sensor built into the z-axis rate gyro.

According to this embodiment, one temperature sensor is used. Because every sensor may have different temperature drift characteristics, the UAV board may be placed in a freezer around 0° C. The UAV board would then be removed from the freezer and allowed to warm up to room temperature. The outputs of the sensors are logged with temperature. The temperature drift coefficients may be derived using a first-order approximation of the sensor output verses temperature. The drift coefficients are then stored. The new temperature compensated values are then stored over the initial data sampled from the sensors.

In the process of sampling 466 the sensors, the sensor bias may be removed. The sensor biases are gathered during sensor calibration. The biases are subtracted from the temperature-compensated analog value. Then the final sensor value may be stored. After the sensor data is compensated for temperature and bias, the next step, in the process of sampling 466 the sensors, is to convert the temperature-compensated, bias shifted values into the correct units. This may be accomplished using the appropriate formula based on the sensor. According to one embodiment, eleven sensors on the UAV board are processed. In addition, in an alternative embodiment, the payload inputs, shown as 254 in FIG. 2, would also be processed, but as the payload may vary, this particular process will not be discussed here.

After the sensors are sampled, they are converted to usable units as part of the sensor processing 466. These conversions will be discussed for each type of sensor below. In one embodiment, the absolute pressure sensor, shown as 240 in FIG. 2, outputs a voltage based on the absolute atmospheric pressure. This pressure is relative to an internal vacuum reference in the sensor. The absolute pressure is used to measure pressure altitude. This is the main altitude reference for the UAV board. The sensor units may be in meters. The altitude is relative to the altitude at which the pressure sensor bias was stored. In general, this is the altitude of the ground station. Thus, the calibrated value for the absolute pressure sensor may be in meters above the ground station.

According to one embodiment, the formula used to convert from the raw output of absolute pressure sensor was derived using empirical data. The sensor output was measured at ground level and then measured again at three hundred feet. The coefficient was then backed out using a linear fit of altitude versus analog output. The temperature-compensated, bias-shifted output of the absolute pressure sensor may be converted to meters above the ground station by multiplying the value by a conversion factor, which, in this embodiment, is 0.9144.

The sampled differential pressure data may also be converted to useable units. In one embodiment the differential pressure sensor, shown in FIG. 2 as 244, outputs a voltage based on the difference in pressure between two external ports. A pitot tube is connected to one of the ports and the other may be left open to the ambient air. The flow of air against the pitot tube causes a pressure difference proportional to the speed of the air. The corresponding voltage produced by the sensor is used to calculate the airspeed of the UAV. The units may be in knots indicated airspeed (KIAS). KIAS is a unit that represents that pressure of the air and, as such, it is not compensated for pressure altitude or air density. In this embodiment, the temperature-compensated output of the sensor is multiplied by 0.044704 to convert to KIAS. The constant may be obtained using a wind tunnel.

The UAV board uses three rate gyros, shown as 238a-c in FIG. 2, to measure the angular rates p, q, and r. These values may be in radians/second. A constant multiplier may be used to convert the output of the rate gyros to radians/second. This is demonstrated by the following equation:

$$\begin{Bmatrix} p \\ q \\ r \end{Bmatrix} = \begin{bmatrix} RollGyro_{Tcomp\_AD} \\ PitchGyro_{Tcomp\_AD} \\ YawGyro_{Tcomp\_AD} \end{bmatrix} \cdot 0.044380$$

The constant may be determined by placing the rate gyro on a rate table spinning at a constant velocity. The output of the sensors would then be divided by the known rate of the table to produce the constant 0.044380.

Two two-axis accelerometers may be used to measure the body fixed accelerations Ax, Ay, and Az in the x, y and z directions, respectively. Each two-axis accelerometer essentially comprises two accelerometers, one for each axis. Since two two-axis accelerometers are used in one embodiment, one axis of one of the accelerometer packages is redundant since measurements in only three directions are typically needed. In one embodiment, since only relative accelerations are needed, the accelerations may remain in temperature-compensated, bias-shifted units. In another embodiment, empirical data suggests that approximately 270 analog-to-digital converter counts are equal to the gravity acceleration due to gravity. The relative accelerations are used in an arctangent function in an attitude estimation process 468 to produce reference values for roll and pitch.

In another embodiment in addition to the sensor measurements, the current from the power source is measured using a current shunt and the system voltage is also sampled. These measurements give an indication of battery power consumption and availability. Those skilled in the art will appreciate how such measurements can be made.

After the sensors are sampled 466, an attitude estimation algorithm 468 is performed. The attitude estimation algorithm 468 estimates the roll, pitch, and yaw of the UAV. The attitude estimation process 468 will be discussed in greater detail in the discussion of FIGS. 6, 7 and 8.

Also, upon sampling 466 the sensors, it is determined 470 whether the UAV is in flight. If the UAV is in flight, the altitude tracking loop 472 is invoked. The altitude tracking loop 472 is used continuously while the UAV is in flight to maintain the desired altitude in an efficient manner. The altitude tracking loop 472 will be discussed in detail in the discussion of FIG. 9.

If the UAV is not in flight or if the altitude tracking loop 472 has completed a cycle, the processor, shown as 230 in FIG. 2, generates 474 values determined through sampling 466 the sensors and the attitude estimation 468. These values are then stored 476 in memory and the sampling loop restarts by sampling 466 the sensors.

While the sensor data is being processed, the UAV board continuously sends data to the ground station, shown in FIG. 1 as 118, through the UAV transmitter/receiver in an update loop 477. The update loop 477 begins by determining 478 whether data needs to be sent to the ground station. According to one method, the question hinges on whether a specified time has expired, such that an update needs to be sent, if a command has been received that asks for data, or if a process has completed that requires that data be sent. In one embodiment, sending of the navigation status and standard telemetry data are the types of data being sent from the update loop. Navigation status may be sent once a second when the GPS receiver, shown in FIG. 2 as 234, has a valid lock. Standard telemetry may be streamed at 10 Hz. Those skilled in the art will recognize that the frequency of data transmission, such as the telemetry or navigation status, can vary based on requirements of the UAV, and is offered only by way of example.

A third continuous loop that runs on the UAV board is a command loop 481. The command loop 481 determines whether a signal has been received 484. If no signal is received, the command loop 481 continues to listen 484 for a signal. If a signal is received, an acknowledgment is generated and sent 486 to the ground station that the signal was received. In one embodiment, the acknowledgment is sent with the update loop 477. After receipt of a signal, the signal is then processed 488 and the appropriate commands are invoked on the UAV board. Those skilled in the art will realize that this loop 481 is not step dependent, but rather the signal could be processed 488 before the acknowledgment is sent 486, or that while the signal is processed 488 or the acknowledgment is being sent 486 the UAV board could be listening for a signal.

The configuration of the memory of the system and command loop 481 allows for gain values to be reconfigured during flight. This may be accomplished by storing gain values in a shared memory location that can be changed through communication with the ground stations. Thus reprogramming the autopilot may be accomplished without the use of a programming cable and can be done in-flight.

Figure 5:
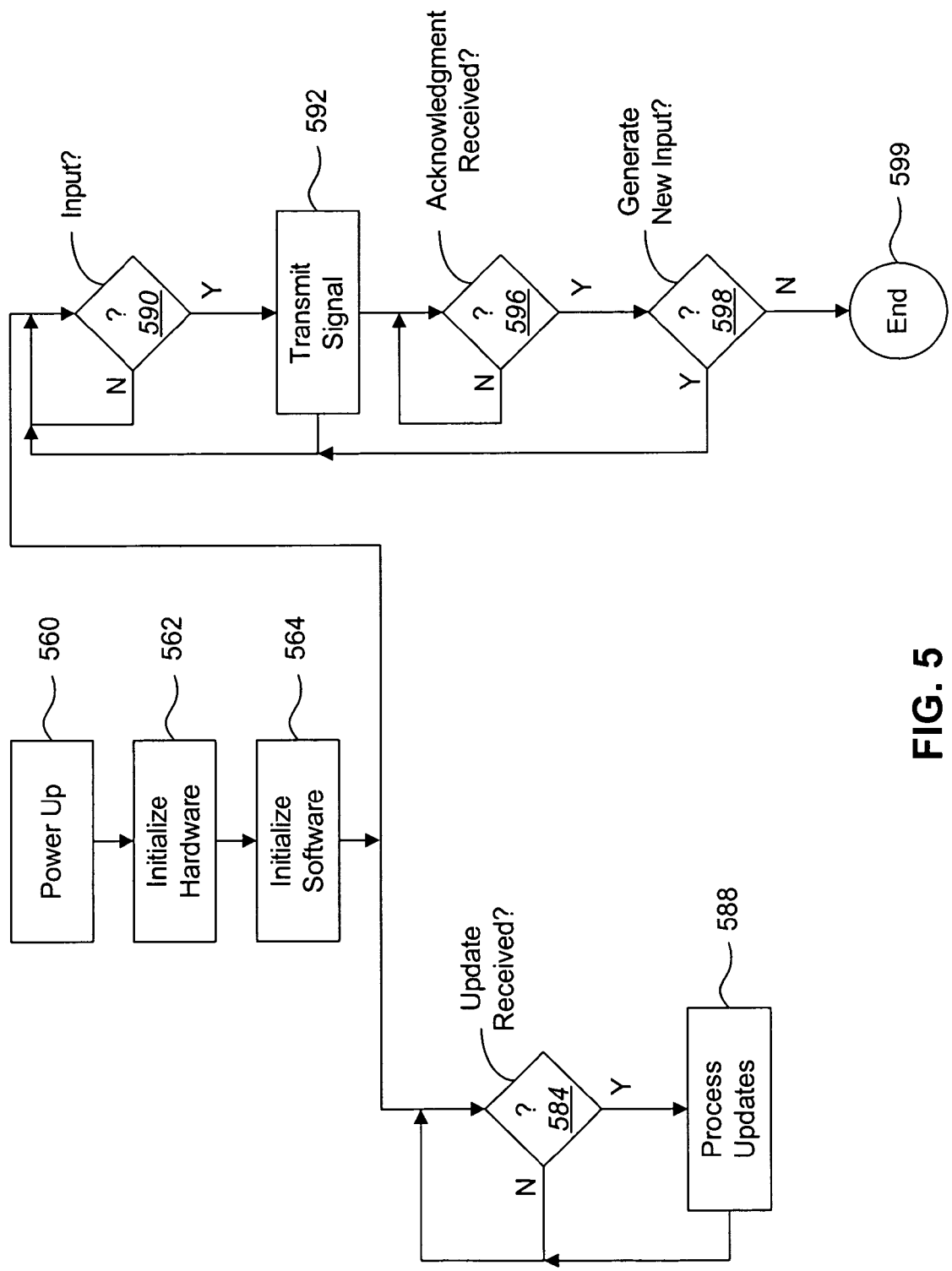
FIG. 5 is a flow diagram illustrating a method for processing, within the ground station, communications between the UAV and the ground station.

FIG. 5 is a flow diagram illustrating a method for processing, within the ground station, communications between the UAV and the ground station. Similar to the processes running on the UAV, the ground station, shown in FIG. 1 as 118, also powers up 560, which provides power to the ground unit, shown as 122 in FIG. 1, and all accessories in the ground station as well as power to the ground station computer, shown in FIG. 1 as 120.

Also similar to the processes on the UAV, the ground station initializes 562 its hardware. This involves initializing any payload processing units, the processor, and the ground transmitter/receiver and ground antenna, shown in FIG. 3 as 326, 324, 328, and 330 respectively, as well as any other accessories in electronic communication with the ground station.

Next, the software is initialized 564. This involves invoking the initial variables and processes to be run on the ground station. After the hardware and software have been initialized (562 and 564 respectively), the ground station begins running several continuous loops simultaneously. One of these continuous loops involves updates received from the UAV board, shown as 212 in FIG. 2. This loop begins by determining 584 whether an update has been received. If no update is received, the ground station continues to listen 584 for updates. If an update is received, the ground station processes 588 the updates and then continues to listen 584 for additional updates.

Another continuous loop that is run involves sending commands to the UAV board. There are many types of commands that can be sent to the UAV board including an auto-takeoff routine, an auto-land routine, a loiter routine, and other more general commands, which will be discussed later. This loop begins by determining 590 whether any inputs are received. Inputs may comprise user-initiated commands at the ground station computer, or alternatively, computer-generated inputs that are pre-programmed on a flight-control software platform. If no inputs are received, the loop waits 590 for an input. If an input is received, the ground station transmits 592 the appropriate signal to the UAV board through the ground transmitter/receiver and antenna, shown in FIG. 3 as 328 and 330 respectively.

After transmitting 592 the signal, the ground station determines 596 whether an acknowledgment is received. If the ground station does not receive an acknowledgment, it continues to listen 596 for one. In one embodiment, the ground station may resend the signal until an acknowledgment is received. If the ground station receives an acknowledgment, it determines 598 whether a new input should be generated. If a new input should be generated 598, a signal is generated and transmitted. If no new input should be generated 596, the loop ends 599.

Figure 6:
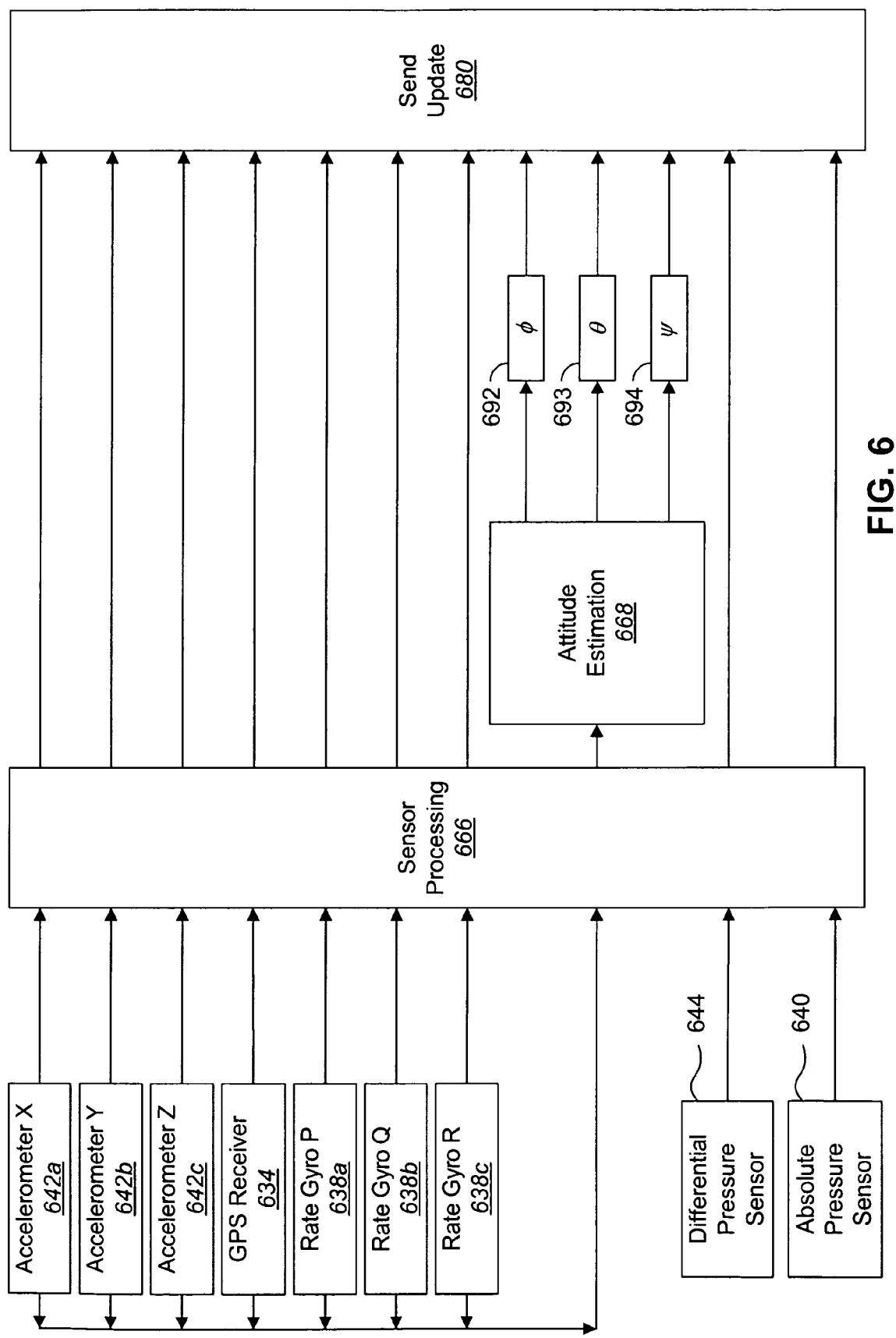
FIG. 6 is a block diagram illustrating the use of variables as inputs in several processes running on one embodiment of the UAV board and the outputs resulting from the processes.

FIG. 6 is a block diagram illustrating the use of variables as inputs in several processes running on one embodiment of the UAV board and the outputs resulting from the process. The variables shown in FIG. 6 are examples of variables used on the UAV board to control the flight of the UAV. In one embodiment, all data from the sensors, including the differential 644 and absolute 640 pressure sensors, on the UAV board is processed 666. This sensor processing is discussed in detail in conjunction with the discussion of FIG. 4. After the sensors are processed and the sensor data is stored, the data from the accelerometers 642*a-c*, the GPS receiver 634, and the rate gyros 638*a-c* is processed in an attitude estimation routine 668. The results of the attitude estimation routine are stored as roll $\phi$ 684, pitch $\theta$ 685, and yaw or heading $\psi$ 686. Then $\phi$ 684, $\theta$ 685, and $\psi$ 686 are sent along with the other processed sensor data in an update 680 to the ground station.

Figure 7:
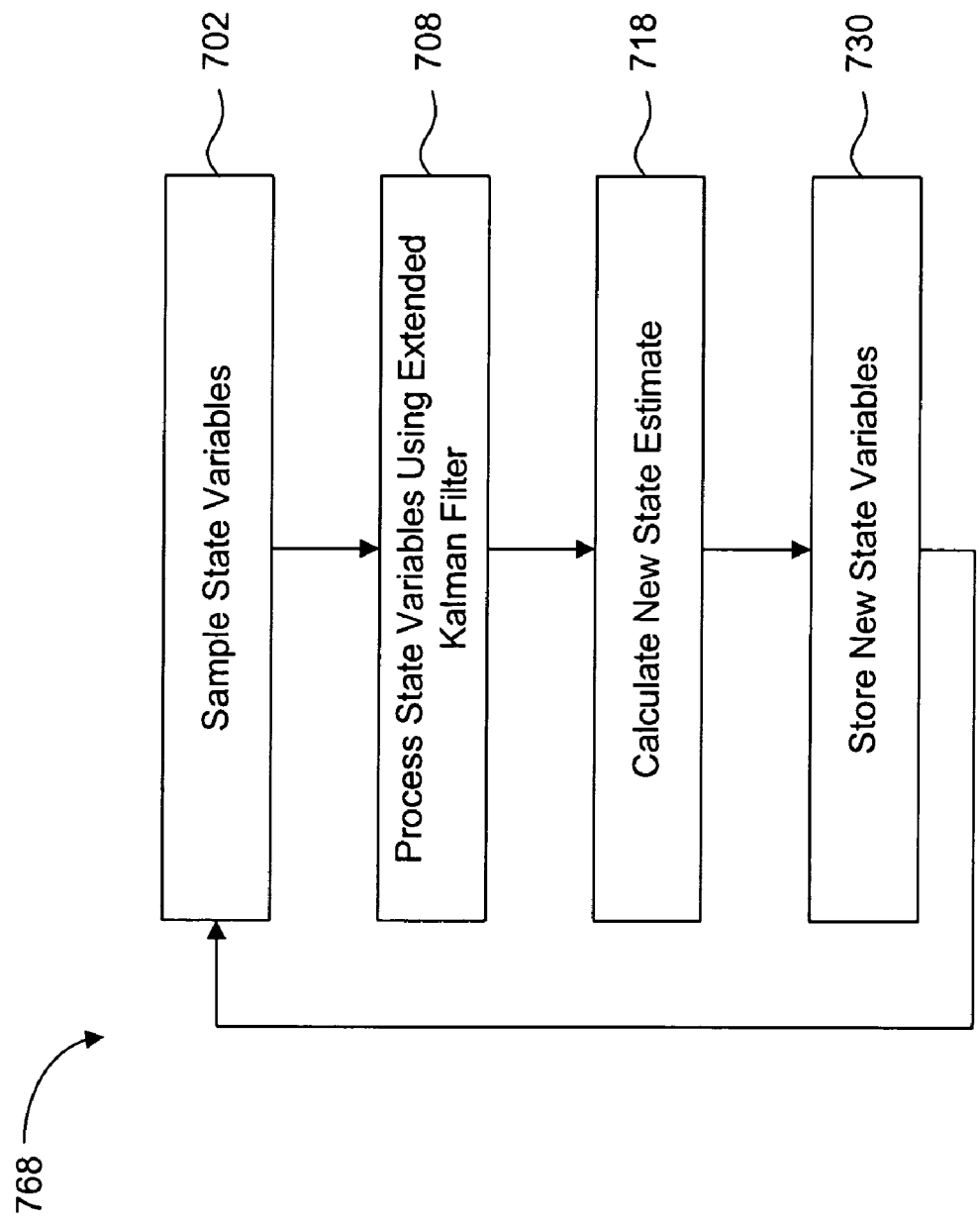
FIG. 7 is a flow diagram illustrating a method for processing sensor data in an attitude estimation process running on one embodiment of the UAV board.

FIG. 7 is a flow diagram illustrating a method for processing sensor data in an attitude estimation process running on one embodiment of the UAV board. The attitude estimation 768 begins by sampling 702 the state variables. The state variables generally define the position and velocity of the UAV. The state variables may initially be determined when the sensors are sampled. The state variables used, as well as the general processing of attitude estimation, will be discussed in more detail in the discussion of FIG. 8. After sampling the state variables 702, they are processed using a fixed gain Kalman filter 708.

The fixed gain Kalman filter process 708 generally involves using the state variables to calculate reference values, which may be compared to calculated attitude references. Then the state values may be updated using an Euler approximation. After the state variables are processed using the Kalman filter 708, the new state estimates are calculated 718. This calculation may be used to approximate the state values by subtracting a weighted calculated error from the current state approximation. After the state variables are sampled 702 and processed using the Kalman filter 708 and the new state estimates are calculated, the new state variables, which represent the current estimated attitude of the UAV, may be stored 730 in memory.

Figure 8:
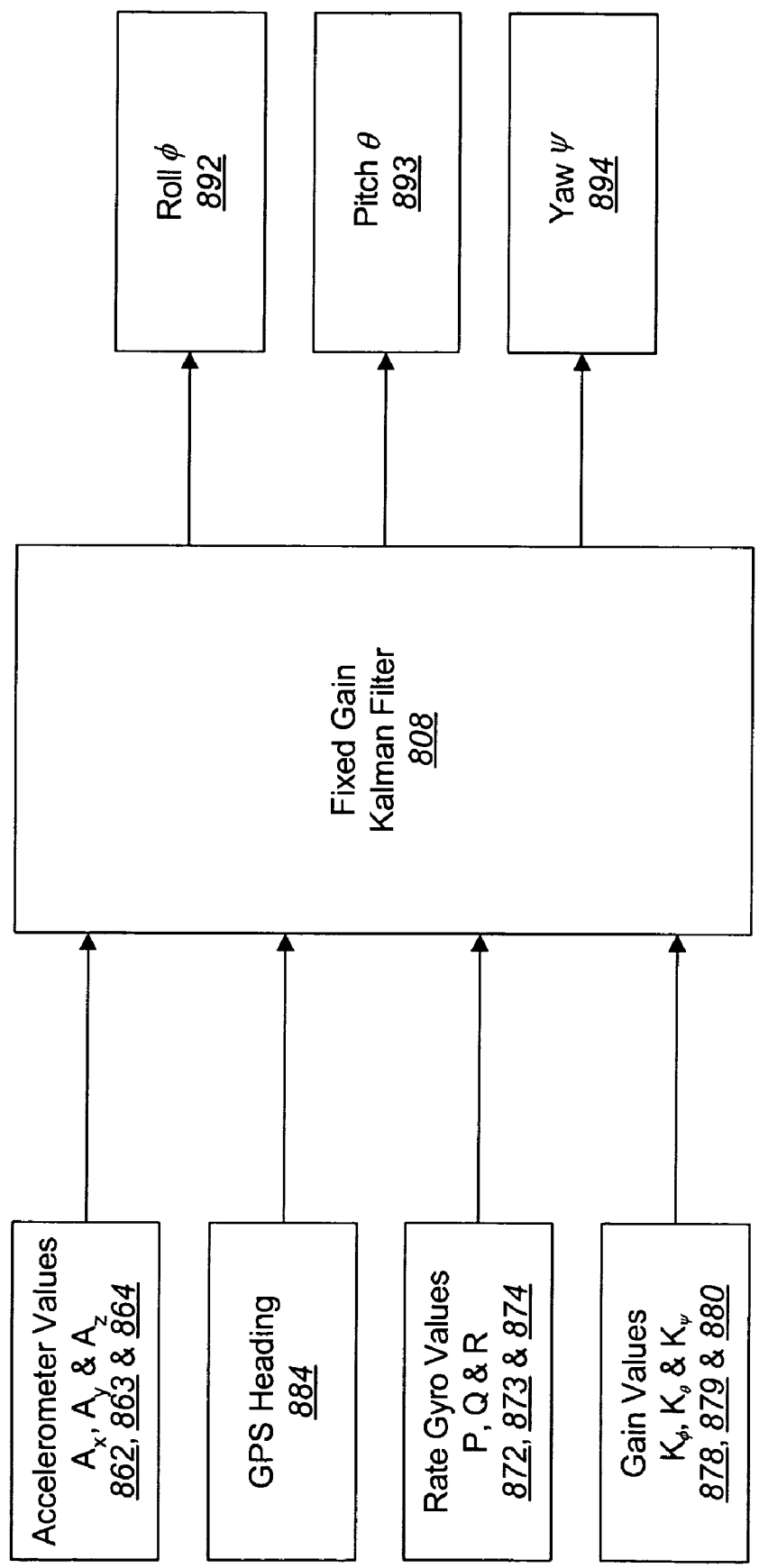
FIG. 8 is a block diagram illustrating a system for the use of variables as inputs in one embodiment of the attitude estimation process running on the UAV board and the resulting outputs of that process.

FIG. 8 is a block diagram illustrating in more detail the system for processing sensor data in the attitude estimation process of FIG. 7. The variables used in the attitude estimation come from the various sensors that are in electronic communication with the UAV board, shown as 212 in FIG. 2. Those skilled in the art will recognize that the sensor data may be processed for temperature, bias and unit conversion in the attitude estimation processor as in this embodiment could be pre-processed as discussed in detail in conjunction with the discussion of FIG. 4.

In one embodiment, the first set of variables shown may come from the accelerometers shown as 242*a-c* in FIG. 2. The variables are the acceleration components in the x, y, and z direction and are stored as Ax 862, Ay 863, and Az 864. The rate gyros, also shown in FIG. 2 as 238*a-c*, provide the next set of variables. These variables are the rotational roll rate, pitch rate, and yaw rate and are stored as p 872, q 873, and r 874, respectively.

The heading value from the GPS receiver, shown as 234 in FIG. 2, is stored as GPS_Heading 884. There are also gain values that are used as weighting factors in the Kalman filter 808. These gain values are applied to the various variables and are stored as $k_\phi$ 878, $k_\theta$ 879, and $k_\psi$ 880. The variables are processed by the Kalman filter 808. This process will be detailed in the description of FIG. 9. After the variables are processed, the Kalman filter 808 outputs the updated state variable estimates for roll, pitch, and yaw. These variables are stored as $\phi$ 892, $\theta$ 893, and $\psi$ 894, respectively.

Figure 9:
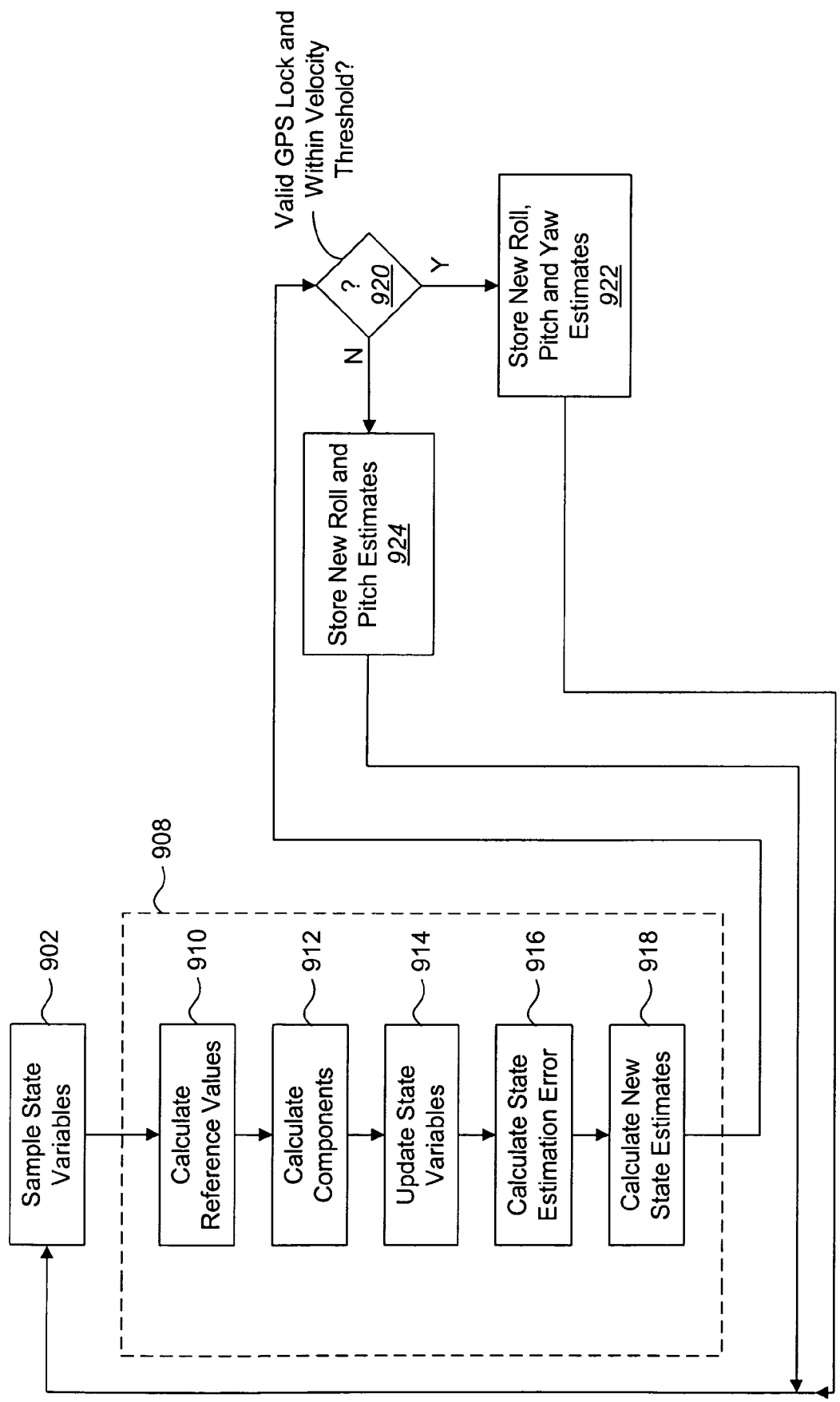
FIG. 9 is a flow diagram illustrating in more detail the method for processing sensor data in the attitude estimation process of FIG. 7.

FIG. 9 is a flow diagram illustrating in more detail the steps involved in an exemplary attitude estimation process. As mentioned in FIG. 7, the attitude estimation samples the state variables 902. As before, these state variables are either retrieved from stored memory, shown as 232 in FIG. 2, after the sensors are processed 466 or can be sampled directly from the sensors. The attitude estimation process estimates roll, pitch, and yaw. In one embodiment, the heading or yaw of the UAV is estimated when the UAV is traveling within a specified threshold velocity and the GPS receiver has a valid lock. After sampling the state variables 902, they are processed using a Kalman filter 908. Initially, a roll and pitch reference may be derived 910 based on the arctangent of the aircraft's acceleration vectors and the gravity vector as well as deriving 910 heading reference from the GPS receiver. This may be accomplished using Eq. 9.1:

$$\begin{Bmatrix} \bar{\phi} \\ \bar{\theta} \\ \bar{\psi} \end{Bmatrix} = \begin{bmatrix} \tan^{-1}\left(\dfrac{Ay}{Ax}\right) \\ \tan^{-1}\left(\dfrac{Ax}{-Az \cdot \cos(\phi) - Ay \cdot \sin(\phi)}\right) \\ \text{GPS\_Heading} \end{bmatrix} \quad \text{Eq. 9.1}$$

where φ is used as a roll angle reference and θ is used as a pitch angle reference. GPS_Heading is the current heading estimate from the GPS receiver. $\bar{\phi}$, $\bar{\theta}$, and $\bar{\psi}$ are the reference values to be determined in Eq. 9.1. These three values may be in radians. These references may suffer from inaccuracy in coordinated turns where the net acceleration of the aircraft is in the negative z direction. In such a case, Eq. 9.1 may produce a zero degree roll angle. Any possible resulting error may be limited during extended coordinated turns by giving minimal weight to the reference roll angle produced by Eq. 9.1 relative to that produced by integrating the rate gyros. A similar error in the reference pitch may occur during a coordinated pull-up where Eq. 9.1 will show zero pitch. However, because coordinated pull-ups are transient events in normal flight, they are not usually a significant factor.

After sampling the state variables 902, the current state estimate may be updated using the roll, pitch, and yaw components of p, q, and r rate gyros. These components of the angular rates $\dot{\phi}$, $\dot{\theta}$, and $\dot{\psi}$, respectively are calculated 912 by Eq. 9.2.

$$\begin{bmatrix} \dot{\phi} \\ \dot{\theta} \\ \dot{\psi} \end{bmatrix} = \begin{bmatrix} 1 & Q \cdot \sin(\phi) & \cos(\phi) \cdot \tan(\theta) \\ 0 & \cos(\phi) & -\sin(\phi) \\ 0 & \sin(\phi) \cdot \cos(\theta) & 0 \end{bmatrix} \cdot \begin{bmatrix} p \\ q \\ r \end{bmatrix} \quad \text{Eq. 9.2}$$

where φ and θ are the current calculated estimate of roll and pitch, respectively. The updated state values of pitch, roll, and yaw are produced 914 by Eq. 9.3.

$$\begin{bmatrix} \hat{\phi} \\ \hat{\theta} \\ \hat{\psi} \end{bmatrix}_{k+1} = \begin{bmatrix} \hat{\phi} \\ \hat{\theta} \\ \hat{\psi} \end{bmatrix}_{k} + \Delta t \cdot \begin{bmatrix} \dot{\phi} \\ \dot{\theta} \\ \dot{\psi} \end{bmatrix}_{k} \quad \text{Eq. 9.3}$$

where $\hat{\phi}$, $\hat{\theta}$, and $\hat{\psi}$ are the state estimates of roll, pitch, and yaw, and k and k+1 represent the $k^{th}$ and the $(k+1)^{st}$ sample or estimate. Δt is the time between samples and may not always be constant given that it is a function of k.

The state estimation error may be determined 916 by taking the updated state values of pitch and roll produced by Eq. 9.3 and subtracting them from the reference values for pitch, roll and yaw computed in Eq. 9.1.

$$\begin{bmatrix} \tilde{\phi} \\ \tilde{\theta} \\ \tilde{\psi} \end{bmatrix} = \begin{bmatrix} \bar{\phi} \\ \bar{\theta} \\ \bar{\psi} \end{bmatrix} - \begin{bmatrix} \hat{\phi} \\ \hat{\theta} \\ \hat{\psi} \end{bmatrix} \quad \text{Eq. 9.4}$$

$\tilde{\phi}$, $\tilde{\theta}$, and $\tilde{\psi}$, in Eq. 9.4, are the state errors. As stated above, rate gyros may cause drift, which may also cause integration error. In order to minimize integration error, the new state estimates of roll φ, pitch θ, and yaw or heading ψ may be determined 918 by taking the error value from Eq. 9.4 and multiplying it by a gain and subtracting from the state estimate determined by Eq. 9.3.

$$\begin{Bmatrix} \phi \\ \theta \\ \psi \end{Bmatrix} = \begin{bmatrix} \hat{\phi} \\ \hat{\theta} \\ \hat{\psi} \end{bmatrix} - \Delta t \cdot \begin{bmatrix} \tilde{\phi} & 0 & 0 \\ 0 & \tilde{\theta} & 0 \\ 0 & 0 & \tilde{\psi} \end{bmatrix} \cdot \begin{bmatrix} k_\phi \\ k_\theta \\ k_\psi \end{bmatrix} \quad \text{Eq. 9.5}$$

Gains $k_\phi$, $k_\theta$, and $k_\psi$ may be determined empirically in flight. To empirically determine the gains, the gains are tuned until the roll, pitch and yaw estimates correspond visually with the airplane's behavior during level flight and in coordinated turns. After the new state estimate is determined, the estimates are stored in memory. In one embodiment, whether the UAV is traveling within a velocity threshold and whether the GPS receiver has a valid lock are determined 920 before storing the heading of the UAV. A possible velocity threshold for an embodiment that uses the Furuno GH-80 GPS receiver is about two meters per second. If there is not a valid GPS lock and the velocity threshold is not met, only the roll and pitch estimates are stored 924. However, if there is a valid GPS lock and the velocity threshold is met all three estimates are stored 922. Even if a valid GPS lock and threshold velocity is required, this determination may be made at any time before the values are stored.

Figure 10:
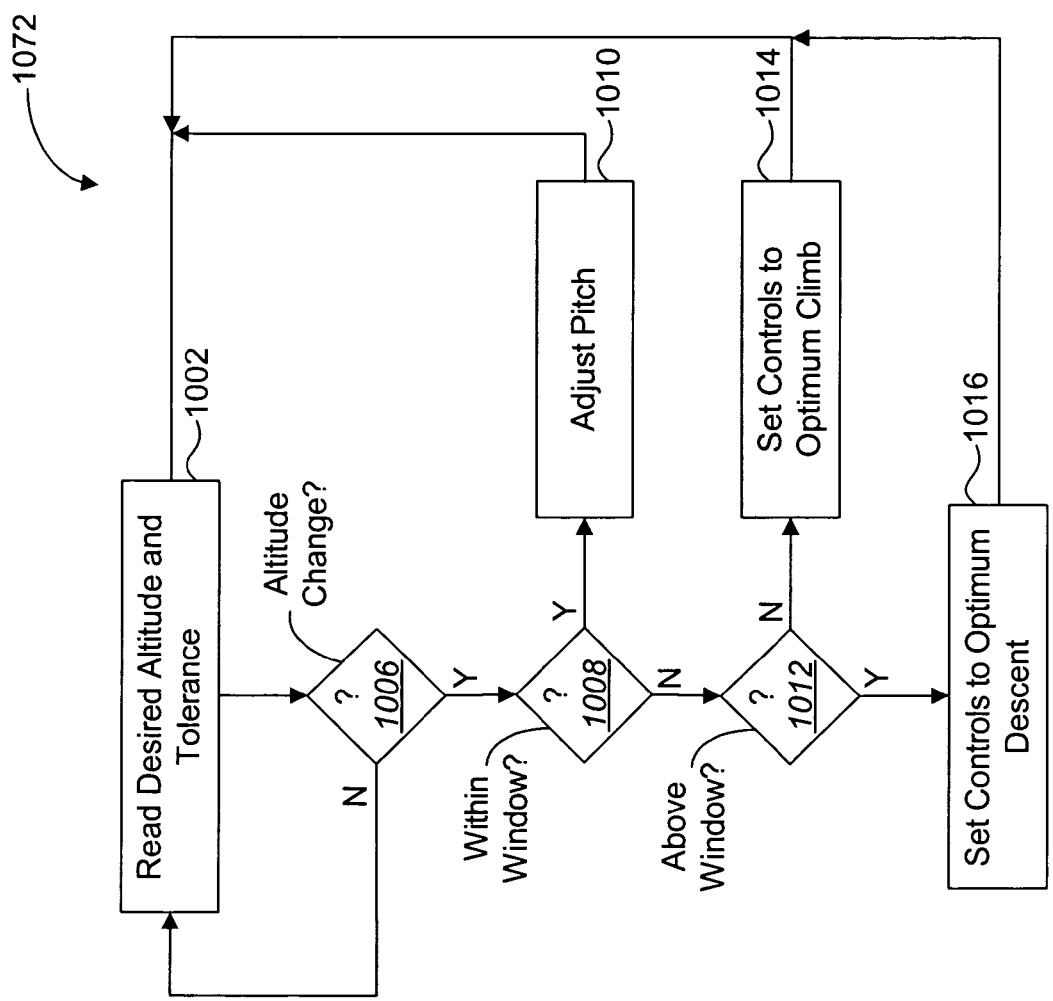
FIG. 10 is a flow diagram illustrating a method for processing on the UAV board an altitude tracking loop.

FIG. 10 is a flow diagram illustrating a method for processing on the UAV board an altitude tracking loop. Minor corrections in altitude may be made using pitch corrections alone. However, when attempting to make some altitude corrections using pitch corrections alone, the UAV may stall. In order to safely maintain altitude, the altitude tracking loop 1072 may be used. The altitude tracking loop 1072 reads a specified altitude and tolerance value 1002 from the UAV memory. In one embodiment, an altitude tolerance value is specified 1002 to allow these pitch corrections to be made, effectively creating an altitude window where pitch corrections may be made. For example, altitude corrections may be made within twenty-five meters above or below the desired altitude. The twenty-five meters above and below the desired altitude 1002 define an altitude tolerance window.

After reading these values, the altitude tracking loop 1072 controls altitude deviations 1006 from the desired altitude. If there is no altitude change, the loop 1072 will continue to listen for changes. If there is a deviation, the loop 1072 will ask 1008 whether the change is within the tolerance window. If the change is within the tolerance window, the pitch may be adjusted 1010 to correct the deviation. After the flight platform adjustment 1010 is made, the loop rereads 1002 the desired altitude and tolerance. If there were changes to either of these values, the loop 1072 would continue, but with these new values. If there are no changes, the loop 1072 continues with the original values. If the change is outside the tolerance window, the loop 1072 determines 1012 whether the UAV is above the tolerance window. If it is outside the window and not above the window, it would logically be below the window and the flight platform may be set 1014 to its optimum climb settings. Optimum climb settings may be a safe positive pitch angle and throttle speed used to ascend into the tolerance window. The optimum climb settings are usually airframe dependent and are determined through experimentation with a particular airframe.

After adjusting 1014 the flight platform settings for optimum climb, the loop 1072 rereads the desired altitude and tolerance. As before, if there were changes to either of these values, the loop 1072 would continue, but with these new values or would continue the loop 1072 with the original values. If the UAV is above the tolerance window, the flight platform may be set 1016 to its optimum descent settings. Optimum descent settings may be a safe negative pitch angle and throttle speed used to descend into the tolerance window, which are often airframe dependent and are determined through experimentation. As before, if there were changes to either of these values, the loop 1072 would continue, but with these new values or would continue the loop with the original values.

Figure 11:
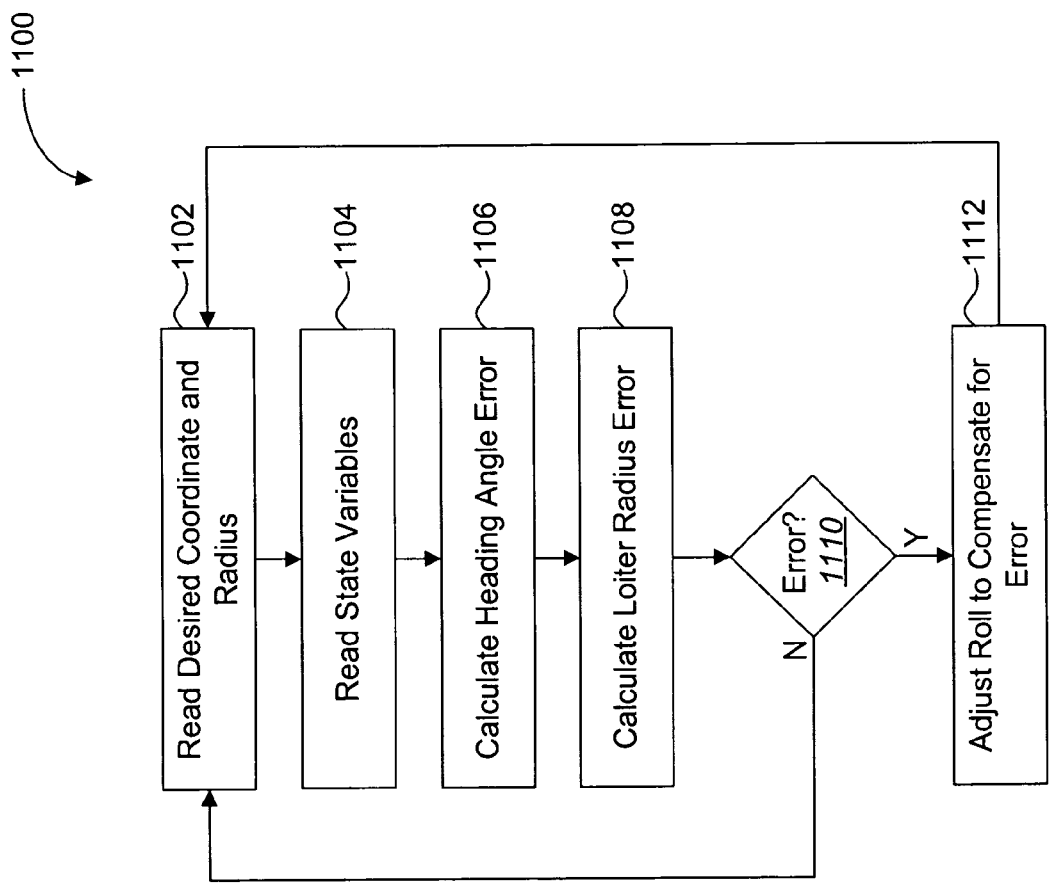
FIG. 11 is a flow diagram illustrating a method for processing on the UAV board a loiter routine.

FIG. 11 is a flow diagram illustrating a method for processing on the UAV board a loiter routine. The loiter routine 1100 may be used to survey a specified target or to simply wait in a location for further commands. The loiter routine 100 may also be combined with other routines as in the auto-land or auto-takeoff routines. In one embodiment, the loiter routine 1100 reads 1102 a defined inertial reference point, which may be defined from the ground station, and a fixed radius. After reading 1102 the desired values, the routine reads 1104 the state variables.

In one embodiment, the state variables read may include the values from the attitude estimation process discussed above in detail in conjunction with FIGS. 7, 8 and 9, as well as velocity and altitude readings. The state variables and the desired coordinate and radius are used to calculate both the heading angle error 1106 and the loiter radius error 1108. In one embodiment, the heading angle error is calculated 1106 by determining the difference between the tangent to the circular orbit path and the airplane's actual heading. The loiter radius error is calculated 1108 by determining the difference between the desired loiter radius and the actual distance of the aircraft from the loiter point, or the center of the orbit circle. After the heading angle error and loiter radius error are calculated (1106 and 1108 respectively) the loiter routine 1100 determines if there is any error 1110.

In one embodiment, this error is determined by using gain values and additional parameters in the error calculations. Gains are used by placing weights on the tangential heading error in the roll angle calculation and the loiter path error in the roll angle calculation. The first parameter is the trim angle. This value is summed into the roll angles produced by the loiter radius error and tangential heading error. This value should be set to the roll angle necessary to produce a circular flight path with the desired radius under trim conditions. The loiter algorithm may be fairly insensitive to this value, and as such this value may be set to a nominal value in the range of the desired radius. The second parameter is the maximum contribution of loiter radius error. This value may limit the maximum contribution of the loiter radius error to the commanded roll angle. This value may be in meters and may be set to a value that is approximately one hundred twenty-five percent of the average commanded loiter radius.

If there is error, then the routine 1100 adjusts the controls on the flight platform, shown as 246 in FIG. 2, governing the roll of the UAV to compensate for the error 1112 and then continues the routine 1100 by rereading 1102 the desired coordinate and radius. The controls used may depend on the type of airframe used. For example, the Zagi THL has no tail rudder controls to specifically control the heading of the airframe, the controls in this case would be the left and right elevators which would oppose each other to change the heading and roll simultaneously. Alternatively, a tail rudder may be used or any other method of control that would change the attitude of the airframe.

If there were changes to either the coordinate or radius, the loop would continue, but the changes would be reflected in the process. For example, if the coordinate were changed, but the radius remained the same, then the loop would continue by reading 1104 the state variables and go on through the rest of the process as before, but with the new coordinate and the old radius. Or, if there were no changes, the loop would continue with the original coordinate and radius. If the loop determines that there is no error, such that the UAV is properly orbiting the desired coordinate at the desired radius, then the loop continues by rereading the desired coordinate and radius. As explained above, if there were changes to either of these values, the loop would continue, but with these new values or would continue the loop with the original values.

Figure 12:
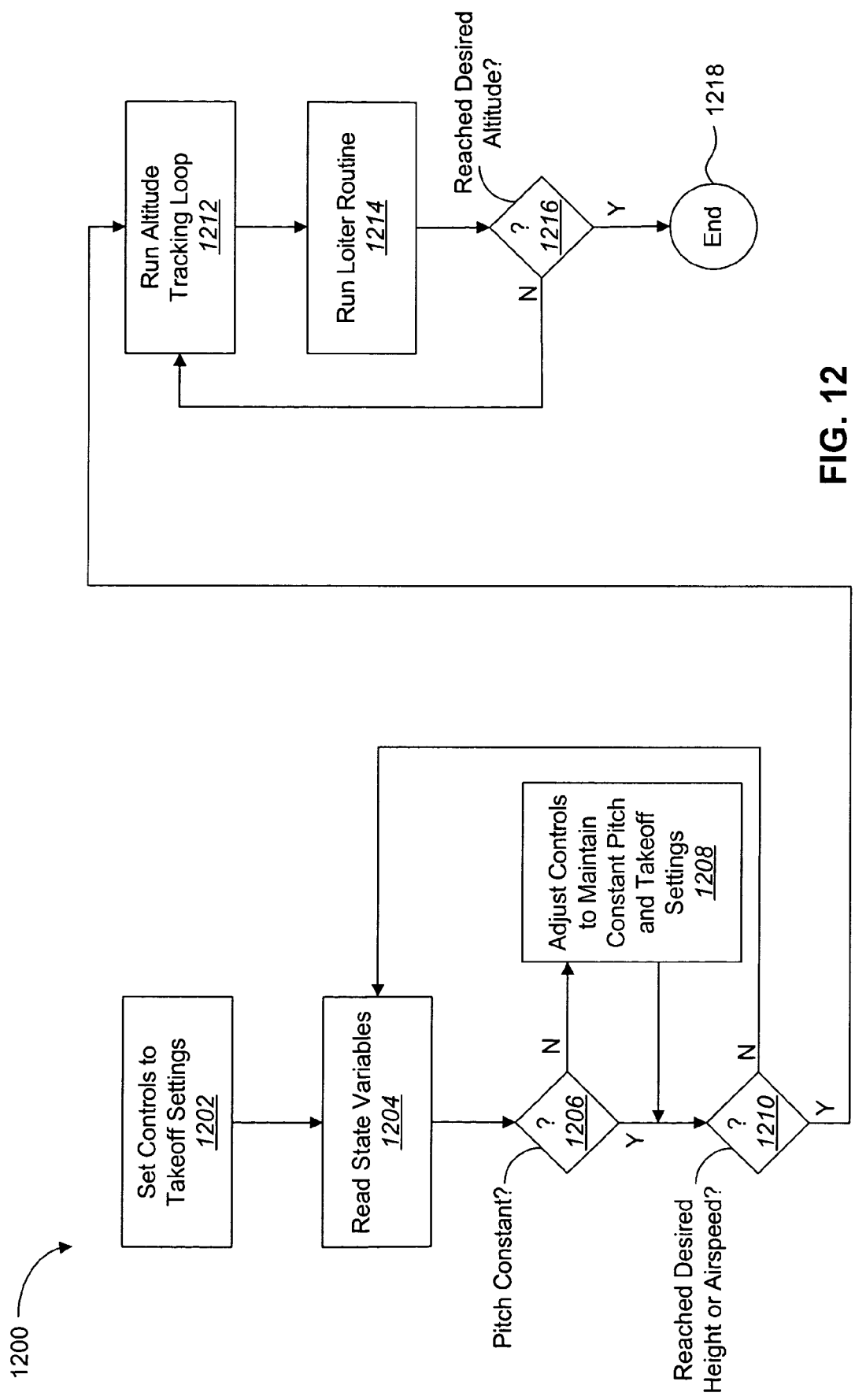
FIG. 12 is a flow diagram illustrating a method for processing on the UAV board an auto-takeoff routine.

FIG. 12 is a flow diagram illustrating a method for processing on the UAV board an auto-takeoff routine. In one embodiment, the auto-takeoff routine 1200 is a two-stage process with an initial takeoff phase and a climb-out phase. In the takeoff phase the UAV attempts to maintain a constant pitch while ascending to either a desired height or airspeed. This is generally desirable because flight is more predictable and easier to control when the UAV reaches a higher altitude or where the UAV reaches a certain airspeed. In another embodiment, only a desired airspeed is attempted. This may be accomplished, for example, by the following method. The flight platform, shown as 246 in FIG. 2, is set 1202 to takeoff settings. The takeoff settings, according to one embodiment, are full throttle, 20° pitch, and zero roll.

After setting 1202 the flight platform to its takeoff settings, the state variables are read 1204. Generally the variables used for this process may include all of the variables used in the attitude estimation discussed in conjunction with FIGS. 7, 8, and 9 as well as the velocity and altitude values. From these values, the routine 1200 determines 1206 whether the pitch is constant. If the pitch is not constant, the flight platform is adjusted 1208 to both maintain a constant pitch and to maintain the original takeoff settings.

After the flight platform is adjusted 1208 or if the pitch is constant, the routine 1200 determines whether the desired height or airspeed has been achieved 1210. If either the desired height or airspeed has been achieved, the climb-out phase begins, otherwise, the state variables are reread 1204 and the routine 1200 begins again. In the climb-out phase a desired altitude and tolerance is specified as well as a fixed coordinate and radius.

Then both the altitude tracking loop 1212 from FIG. 10 and the loiter routine 1214 from FIG. 11 are invoked. The altitude tracking loop 1212 attempts to maintain stability about a desired altitude. However, it 1212 may also be used in this instance to produce a safe ascent to a desired elevation. Essentially, setting the desired elevation above the current elevation may put the UAV outside of the altitude tolerance window discussed above. This may put the UAV into optimum climb mode until the threshold window is achieved, where the pitch alone will be adjusted until the desired elevation is reached. Adding the altitude tracking loop 1212 with the loiter routine 1214 may produce a spiral ascension to the desired altitude about a desired coordinate, as the loiter routine 1214 attempts to maintain a fixed orbit about the desired coordinate.

The climb-out phase determines whether the UAV has reached the desired altitude 1216. If the desired altitude has been reached, the loop ends 1218. If it has not, then the altitude tracking loop and loiter routine will continue to process to spirally ascend about the desired inertial coordinate until the desired altitude is achieved.

Figure 13:
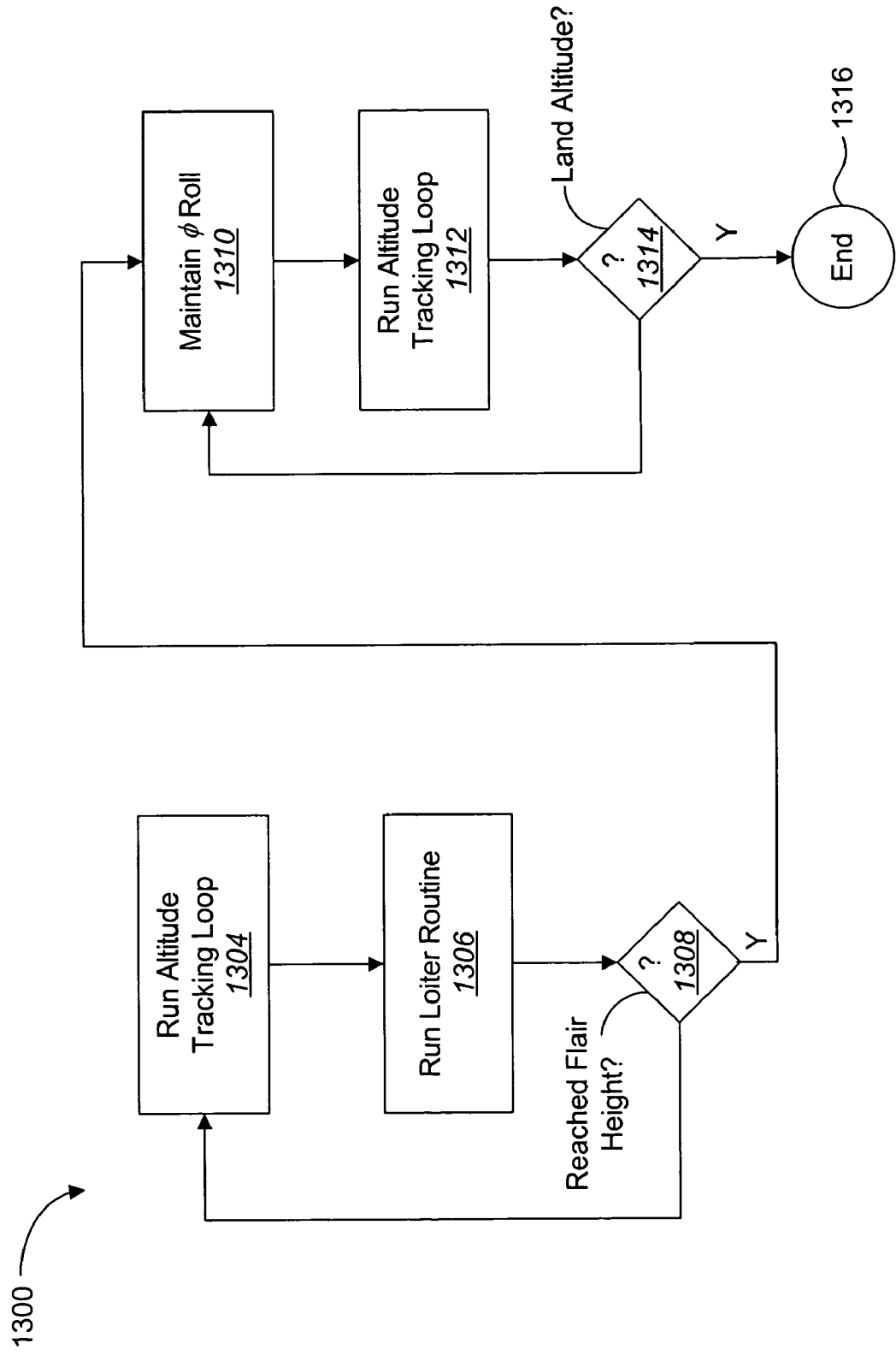
FIG. 13 is a flow diagram illustrating a method for processing on the UAV board an auto-land routine.

FIG. 13 is a flow diagram illustrating a method for processing on the UAV board an auto-land routine. In one embodiment, the auto-land routine 1300 is a two-stage process with a spiraling descent phase and a landing phase. In the spiraling descent phase an altitude, commonly known as the flare height, and tolerance is specified as well as a fixed coordinate and radius.

Then both the altitude tracking loop 1304 from FIG. 10 and the loiter routine 1306 from FIG. 11 are invoked. Similar to the discussion in conjunction with FIG. 12, invoking the altitude tracking loop 1304 and the loiter routine 1306 produces a spiraling orbit about a desired coordinate until a desired altitude is reached. In this case, the desired altitude may be below the current altitude such that it would be above the altitude tolerance window. This puts the altitude tracking loop 1304 into optimum descent until within the threshold window, where the descent is made by simple pitch changes. This descent in conjunction with the loiter routine 1306 produces a spiraling descent until the flare height is reached. The spiraling descent phase determines 1308 whether the UAV has reached the flare height. If the flare height has been reached the landing phase begins, otherwise, the altitude tracking loop 1304 and loiter routine 1306 will continue, such that the UAV will spirally descend about the desired inertial coordinate until the flare height is reached. In alternative embodiments, the auto-land routine 1300 comprises only the loiter routine 1306 component and does not enter a landing phase, but instead spirals all the way to the ground.

In the landing phase, the UAV attempts to maintain 1310 a 0° roll while running the altitude tracking loop 1312 with a desired altitude, the landing altitude. The 0° roll is maintained while the altitude tracking loop 1312 runs until auto-land routine 1300 determines 1314 that the UAV has reached the landing altitude. If the landing altitude is reached the routine 1300 ends 1316, otherwise the 0° roll will be maintained while the altitude tracking loop 1312 runs until the landing altitude is reached.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An autopilot control system for an unmanned aerial vehicle, comprising:
   a ground station; and
   an on-plane control system, comprising:
   a processor;
   memory in electronic communication with the processor;
   three accelerometers in electronic communication with the processor;
   three rate gyroscopes in electronic communication with the processor;
   an absolute pressure sensor in electronic communication with the processor;
   a differential pressure sensor in electronic communication with the processor;
   a global positioning system in electronic communication with the processor;

a transceiver in electronic communication with the processor to receive and transmit wireless signals; and a power source that supplies power to both the on-plane control system and to an actuator used to propel the unmanned aerial vehicle.

2. The autopilot control system as defined in claim 1, wherein the ground station further comprises:

a processor;

memory in electronic communication with the processor;

a user interface in electronic communication with the processor; and a transceiver in electronic communication with the processor to receive and transmit wireless signals.

3. The autopilot control system as defined in claim 2, wherein the ground station further comprises an RC controller in electronic communication with the ground station processor to provide manual control of the unmanned aerial vehicle.

4. The autopilot control system as defined in claim 3, wherein the on-plane control system further comprises a bypass circuit that allows the unmanned aerial vehicle to be controlled by the RC controller instead of the on-plane control system.

5. The autopilot control system as defined in claim 2, wherein flight control parameters of the unmanned aerial vehicle are reconfigurable from the ground station while the unmanned aerial vehicle is in flight.

6. The autopilot control system as defined in claim 2, wherein the on-plane transceiver and the ground station transceiver are digital modems.

7. The autopilot control system as defined in claim 1, wherein the on-plane control system further comprises executable instructions executable by the on-plane processor, wherein the executable instructions are configured to implement a method for estimating attitude, comprising:

sampling state variables provided in part by the accelerometers, rate gyroscopes, absolute pressure sensor, differential pressure sensor, and the global positioning system;

processing the state variables through a fixed gain Kalman Filter;

calculating new state variable estimates; and storing the new state variable estimates in the on-plane memory.

8. The autopilot control system as defined in claim 7, wherein the executable instructions are further configured to implement a method for tracking a desired altitude, comprising:

reading a desired altitude and tolerance;

adjusting a pitch angle to reach the desired altitude when the unmanned aerial vehicle deviates from the desired altitude but is within the desired tolerance;

adjusting the pitch angle and increasing throttle to reach the desired altitude when the unmanned aerial vehicle is below the desired altitude and outside the desired tolerance; and adjusting the pitch angle and decreasing throttle to reach the desired altitude when the unmanned aerial vehicle is above the desired altitude and outside the desired tolerance.

9. The autopilot control system as defined in claim 8, wherein the executable instructions are further configured to implement a method for loitering the unmanned aerial vehicle about a desired waypoint, comprising:

reading a desired waypoint and orbiting radius;

estimating the attitude of the unmanned aerial vehicle;

calculating a heading angle error of the unmanned aerial vehicle;

calculating a loiter radius error of the unmanned aerial vehicle; and adjusting roll of the unmanned aerial vehicle to compensate for any detected error.

10. The autopilot control system as defined in claim 9, wherein the executable instructions are further configured to implement a method for automatic take-off of the unmanned aerial vehicle, comprising:

estimating the attitude of the unmanned aerial vehicle;

maintaining a constant pitch of the unmanned aerial vehicle until a desired climb-out altitude or airspeed is reached; and tracking the desired altitude and loitering the unmanned aerial vehicle about the desired waypoint once the desired climb-out altitude or airspeed is reached.

11. The autopilot control system as defined in claim 9, wherein the executable instructions are further configured to implement a method for automatic landing of the unmanned aerial vehicle, comprising:

setting the desired altitude at a flare height;

tracking the desired altitude and loitering the unmanned aerial vehicle about the desired waypoint until the flare height is reached; and maintaining zero roll and a constant pitch of the unmanned aerial vehicle when the flare height is reached and until a desired landing altitude is reached.

12. An autopilot control system for an unmanned aerial vehicle, comprising:

a ground station; and an on-plane control system, comprising:

a processor;

memory in electronic communication with the processor;

three accelerometers in electronic communication with the processor;

three rate gyroscopes in electronic communication with the processor;

an absolute pressure sensor in electronic communication with the processor;

a differential pressure sensor in electronic communication with the processor;

a global positioning system in electronic communication with the processor;

a transceiver in electronic communication with the processor to receive and transmit wireless signals; and executable instructions executable by the processor, wherein the executable instructions are configured to implement a method for estimating attitude comprising:

sampling state variables provided in part by the accelerometers, rate gyroscopes, absolute pressure sensor, differential pressure sensor, and the global positioning system;

processing the state variables through a fixed gain Kalman Filter;

calculating new state variable estimates; and storing the new state variable estimates in memory.

13. The autopilot control system as defined in claim 12, wherein the executable instructions are further configured to implement a method for tracking a desired altitude, comprising:

reading a desired altitude and tolerance;

adjusting a pitch angle to reach the desired altitude when the unmanned aerial vehicle deviates from the desired altitude but is within the desired tolerance;

adjusting the pitch angle and increasing throttle to reach the desired altitude when the unmanned aerial vehicle is below the desired altitude and outside the desired tolerance; and adjusting the pitch angle and decreasing throttle to reach the desired altitude when the unmanned aerial vehicle is above the desired altitude and outside the desired tolerance.

14. The autopilot control system as defined in claim 13, wherein the executable instructions are further configured to implement a method for loitering the unmanned aerial vehicle about a desired waypoint, comprising:

reading a desired waypoint and orbiting radius;
estimating the attitude of the unmanned aerial vehicle;
calculating a heading angle error of the unmanned aerial vehicle;
calculating a loiter radius error of the unmanned aerial vehicle; and
adjusting roll of the unmanned aerial vehicle to compensate for any detected error.

15. The autopilot control system as defined in claim 14, wherein the executable instructions are further configured to implement a method for automatic take-off of the unmanned aerial vehicle, comprising:

estimating the attitude of the unmanned aerial vehicle;
maintaining a constant pitch of the unmanned aerial vehicle until a desired climb-out altitude or airspeed is reached; and
tracking the desired altitude and loitering the unmanned aerial vehicle about the desired waypoint once the desired climb-out altitude or airspeed is reached.

16. The autopilot control system as defined in claim 14, wherein the executable instructions are further configured to implement a method for automatic landing of the unmanned aerial vehicle, comprising:

setting the desired altitude at a flare height;
tracking the desired altitude and loitering the unmanned aerial vehicle about the desired waypoint until the flare height is reached; and
maintaining zero roll and a constant pitch of the unmanned aerial vehicle when the flare height is reached and until a desired landing altitude is reached.

17. An autopilot control system for an unmanned aerial vehicle, comprising:

a processor;
memory in electronic communication with the processor;
three accelerometers in electronic communication with the processor;
three rate gyroscopes in electronic communication with the processor;
an absolute pressure sensor in electronic communication with the processor;
a differential pressure sensor in electronic communication with the processor;
a global positioning system in electronic communication with the processor;
a transceiver in electronic communication with the processor to receive and transmit wireless signals; and
executable instructions executable by the processor, wherein the executable instructions are configured to implement a method for estimating attitude comprising:

sampling state variables provided in part by the accelerometers, rate gyroscopes, absolute pressure sensor, differential pressure sensor, and the global positioning system;
processing the state variables through a fixed gain Kalman Filter;
calculating new state variable estimates; and
storing the new state variable estimates in memory.

18. The autopilot control system as defined in claim 17, wherein the executable instructions are further configured to implement a method for tracking a desired altitude, comprising:

reading a desired altitude and tolerance;
adjusting a pitch angle to reach the desired altitude when the unmanned aerial vehicle deviates from the desired altitude but is within the desired tolerance;
adjusting the pitch angle and increasing throttle to reach the desired altitude when the unmanned aerial vehicle is below the desired altitude and outside the desired tolerance; and
adjusting the pitch angle and decreasing throttle to reach the desired altitude when the unmanned aerial vehicle is above the desired altitude and outside the desired tolerance.

19. The autopilot control system as defined in claim 18, wherein the executable instructions are further configured to implement a method for loitering the unmanned aerial vehicle about a desired waypoint, comprising:

reading a desired waypoint and orbiting radius;
estimating the attitude of the unmanned aerial vehicle;
calculating a heading angle error of the unmanned aerial vehicle;
calculating a loiter radius error of the unmanned aerial vehicle; and
adjusting roll of the unmanned aerial vehicle to compensate for any detected error.

20. The autopilot control system as defined in claim 19, wherein the executable instructions are further configured to implement a method for automatic take-off of the unmanned aerial vehicle, comprising:

estimating the attitude of the unmanned aerial vehicle;
maintaining a constant pitch of the unmanned aerial vehicle until a desired climb-out altitude or airspeed is reached; and
tracking the desired altitude and loitering the unmanned aerial vehicle about the desired waypoint once the desired climb-out altitude or airspeed is reached.

21. The autopilot control system as defined in claim 19, wherein the executable instructions are further configured to implement a method for automatic landing of the unmanned aerial vehicle, comprising:

setting the desired altitude at a flare height;
tracking the desired altitude and loitering the unmanned aerial vehicle about the desired waypoint until the flare height is reached; and
maintaining zero roll and a constant pitch of the unmanned aerial vehicle when the flare height is reached and until a desired landing altitude is reached.

* * * * *

UNITED STATES PATENT AND TRADEMARK OFFICE
CERTIFICATE OF CORRECTION

PATENT NO. : 7,302,316 B2
APPLICATION NO. : 10/940411
DATED : November 27, 2007
INVENTOR(S) : Randal W. Beard et al.

Page 1 of 1

It is certified that error appears in the above-identified patent and that said Letters Patent is hereby corrected as shown below:

Please replace the paragraph on col. 1, lines 7-11 with the following rewritten paragraph:

--This invention was made with government support under contract # F49620-02-C-0094 and contract # F08630-03-1-0017 awarded by USAF/AFO. The government has certain rights in the invention.--

Signed and Sealed this

Sixth Day of October, 2009

David J. Kappos
*Director of the United States Patent and Trademark Office*